United States Patent [19]
Nakazawa

[11] Patent Number: 5,854,547
[45] Date of Patent: Dec. 29, 1998

[54] CONTROL SYSTEM FOR PERMANENT MAGNET SYNCHRONOUS MOTOR

[75] Inventor: Yosuke Nakazawa, Tokyo, Japan

[73] Assignee: Kabushiki Kaisha Toshiba, Kawasaki, Japan

[21] Appl. No.: 709,843

[22] Filed: Sep. 10, 1996

[30] Foreign Application Priority Data

Sep. 11, 1995 [JP] Japan ................................. 7-232212

[51] Int. Cl.$^6$ ....................................................... H02P 7/06
[52] U.S. Cl. ........................ 318/716; 318/432; 318/434; 318/712; 318/802; 318/811
[58] Field of Search ................................. 318/720–724, 318/432, 434, 798–811

[56] References Cited

U.S. PATENT DOCUMENTS

| | | | |
|---|---|---|---|
| 5,144,564 | 9/1992 | Naidu et al. ............................. | 364/494 |
| 5,504,404 | 4/1996 | Tamaki et al. ........................... | 318/432 |
| 5,652,495 | 7/1997 | Narazaki et al. ........................ | 318/719 |
| 5,656,911 | 8/1997 | Nakayama et al. ...................... | 318/718 |

*Primary Examiner*—David S. Martin
*Attorney, Agent, or Firm*—Oblon,. Spivak, McClelland, Maier & Neustadt, P.C.

[57] ABSTRACT

To provide a control system for a permanent magnet synchronous motor which can ensure stability of the current control system, even if the revolution frequency of the motor becomes higher and the terminal voltage of the motor exceeds the inverter maximum output voltage. In this method, when the revolution frequency of the motor exceeds a specified value, the size of the voltage vector is made a specified voltage vector, and a modulation factor based on its value is obtained. At the same time, a magnetic flux direction current correction value is found based on the size of a voltage vector from a polarity coordinates conversion unit and the above specified voltage vector size. Then, the magnetic flux direction current instruction is corrected by that value.

8 Claims, 14 Drawing Sheets

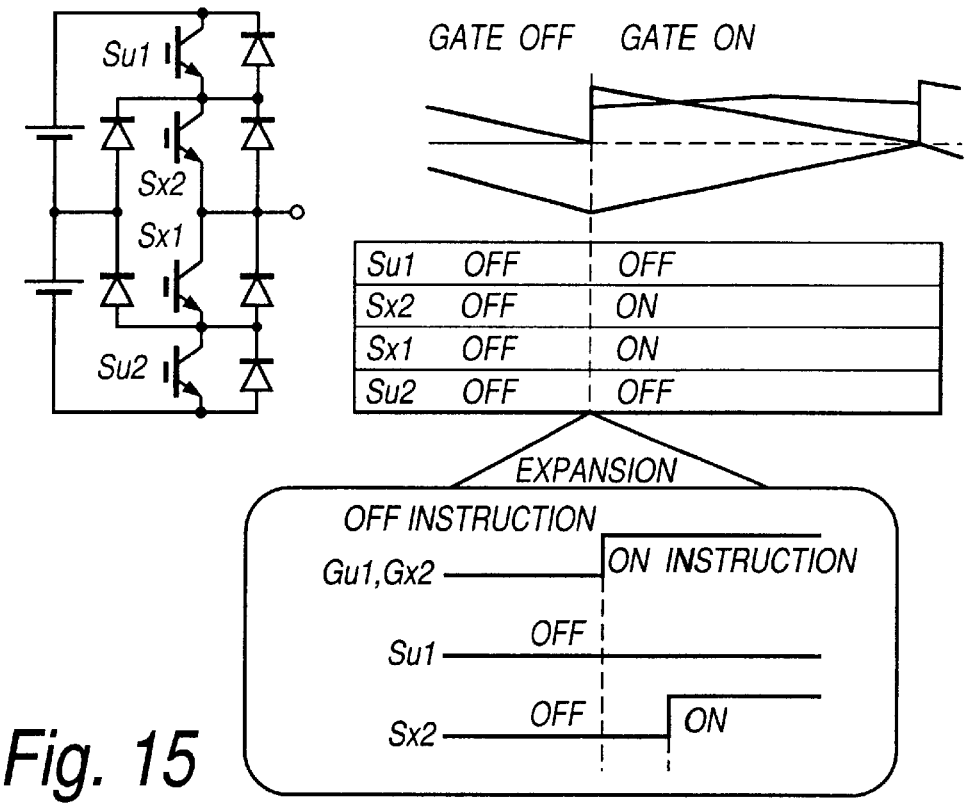
Fig. 15
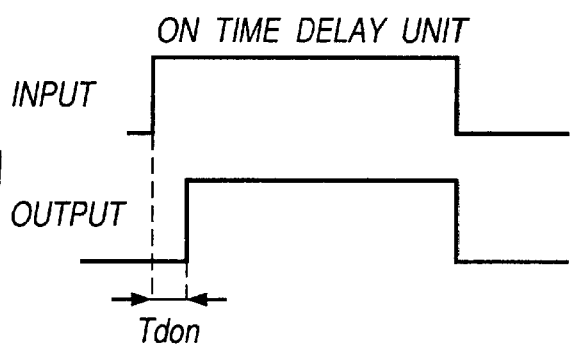
Fig. 18a
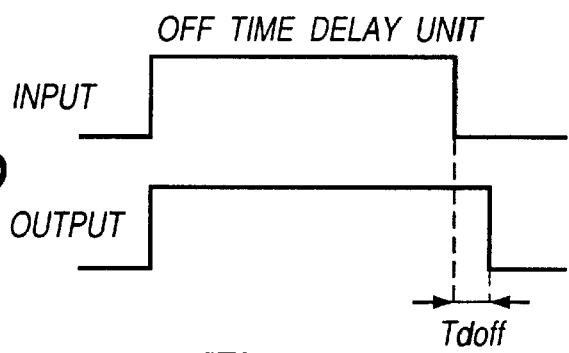
Fig. 18b
Fig. 18

CONTROL SYSTEM FOR PERMANENT MAGNET SYNCHRONOUS MOTOR

BACKGROUND OF THE INVENTION

1. Field of the Invention

This invention is related to a control system for a permanent magnet synchronous motor.

2. Description of the Related Art

An example of a prior art control system for a permanent magnet synchronous motor is shown as FIG. 19.

The control system consists of current control unit 1, voltage coordinates conversion unit 2, triangular wave generating unit 3 and PWM voltage operation unit 4.

In the current control unit 1, a magnetic flux current instruction IdRef, torque current instruction IqRef, and d axis current Id and q axis current Iq which are the load current converted to the d and q axes (which are orthogonal to each other) are inputted. Magnetic flux current instruction IdRef and d axis current Id are compared and any deviation is found. The torque current instruction IqRef and the q axis current Iq are also compared and any deviation is found. Then, magnetic flux voltage instruction VdRef is found through proportional-plus-integral control based on the deviation between magnetic flux current instruction IdRef and d axis current Id. Torque voltage instruction VqRef is also found based on the deviation between torque current instruction IqRef and q axis current Iq.

In the voltage coordinates conversion unit 2, magnetic flux voltage instruction VdRef and torque voltage instruction VqRef are converted from a 2-phase to 3-phase based on a motor magnetic flux angle θr. The 3-phase voltage control signals VuRef, VvRef and VwRef are found and outputted.

In the triangular wave generating unit 3, two triangular waves, one positive and one negative, TRIP and TRIM, respectively, with constant frequencies are generated. Here, an NPC (neutral point clamp) inverter is assumed to be the power converter which exercises control.

In the PWM voltage operation unit 4, the 3-phase voltage control signals VuRef, VvRef and VwRef are compared with triangular waves TRIP and TRIM to output 3-phase PWM voltage instructions.

The permanent magnet synchronous motor is controlled by controlling the output voltage of the inverter based on these 3-phase PWM voltage instructions.

With this type of control system for a permanent magnet synchronous motor, current instantaneous value control is exercised by current feedback control. For this reason, if the revolution frequency of the motor increases and the terminal voltage of the motor exceeds the maximum output voltage of the inverter, the current control system will become unstable. Therefore, there is a requirement to pass a field weakening current, which does not contribute to the torque, so that the terminal voltage of the motor does not exceed the maximum output voltage of the inverter.

However, there are problems with the passing of a field weakening current, such as the generation of heat in the motor and the increase of the inverter current capacity.

Also, the magnetic flux of the permanent magnet varies depending on the temperature. Therefore, if the motor temperature varies, the magnetic flux of the permanent magnet will also vary. For this reason, if control is exercised by taking the magnetic flux as constant, the output torque will not follow the torque instruction and accurate torque control cannot be exercised.

Moreover, with prior art control, when the motor was coasting, the inverter was always operating despite the fact that no torque was outputted. This produced wasteful heat generation in the inverter and a reduction of efficiency in the whole system.

SUMMARY OF THE INVENTION

The object of this invention is to provide a control system for a permanent magnet synchronous motor which solves the various problems mentioned above.

According to this invention, there is provided a control system for a permanent magnet synchronous motor which controls a permanent magnet synchronous motor via a power conversion system, comprising a control system for a permanent magnet synchronous motor which has the characteristic of being provided with a current instruction value operation unit which takes as its inputs a torque instruction, the motor angular frequency and the magnetic flux direction current correction value which is outputted from the below-mentioned magnetic flux direction current correction value operation device, and operates a magnetic flux direction current instruction and a torque direction current instruction; a voltage instruction operation unit which takes as its inputs the magnetic flux direction current instruction and the torque direction current instruction which are the outputs of this current instruction value operation unit, and operates a magnetic flux direction voltage instruction and a torque direction voltage instruction; a polar coordinates conversion unit which takes as its inputs the magnetic flux direction voltage instruction and the torque direction voltage instruction which are the outputs of this voltage instruction operating unit, and operates the voltage vector size and the voltage vector angle to the magnetic flux axis direction; a voltage fixing unit which takes as its inputs the voltage vector size which is the output of this polar coordinates conversion unit, a specified fixed voltage vector size and the voltage fixing instruction, and selects either the voltage vector size from the said polar coordinates conversion unit or the fixed voltage vector size according to the voltage fixing instruction; a magnetic flux direction current correction value operation unit which takes as its inputs the voltage vector size outputted from the said polar coordinates conversion unit and the voltage vector size selected by the said voltage fixing unit, and operates the said magnetic flux direction current correction; a modulation factor operation unit which takes as its inputs the voltage vector size selected by the said voltage fixing unit and the DC link voltage of the said power conversion system, and operates the modulation factor of the said power conversion system; a torque current control unit which takes as its inputs the torque direction current instruction outputted from the said current instruction value operation unit and the torque current actual value, and operates a torque angle correction value; and a PWM voltage generating unit which takes as its inputs the modulation factor outputted from the said modulation factor operation unit, the voltage vector angle outputted from the said polar coordinates conversion unit and the sum of the torque angle correction value outputted from the said torque current control unit and permanent magnet magnetic flux angle, and outputs PWM voltage instructions for the said power conversion system.

BRIEF DESCRIPTION OF THE DRAWINGS

FIG. 15 is a switching illustration for the time when the triangular wave on one side is shifted 180 degrees;

FIG. 18 is an operation diagram for ON/OFF time delay unit of the ninth actual configuration.

DETAILED DESCRIPTION OF THE PREFERRED EMBODIMENTS

The following are descriptions of some actual configurations of this invention with reference to the drawings.

Figure 1:
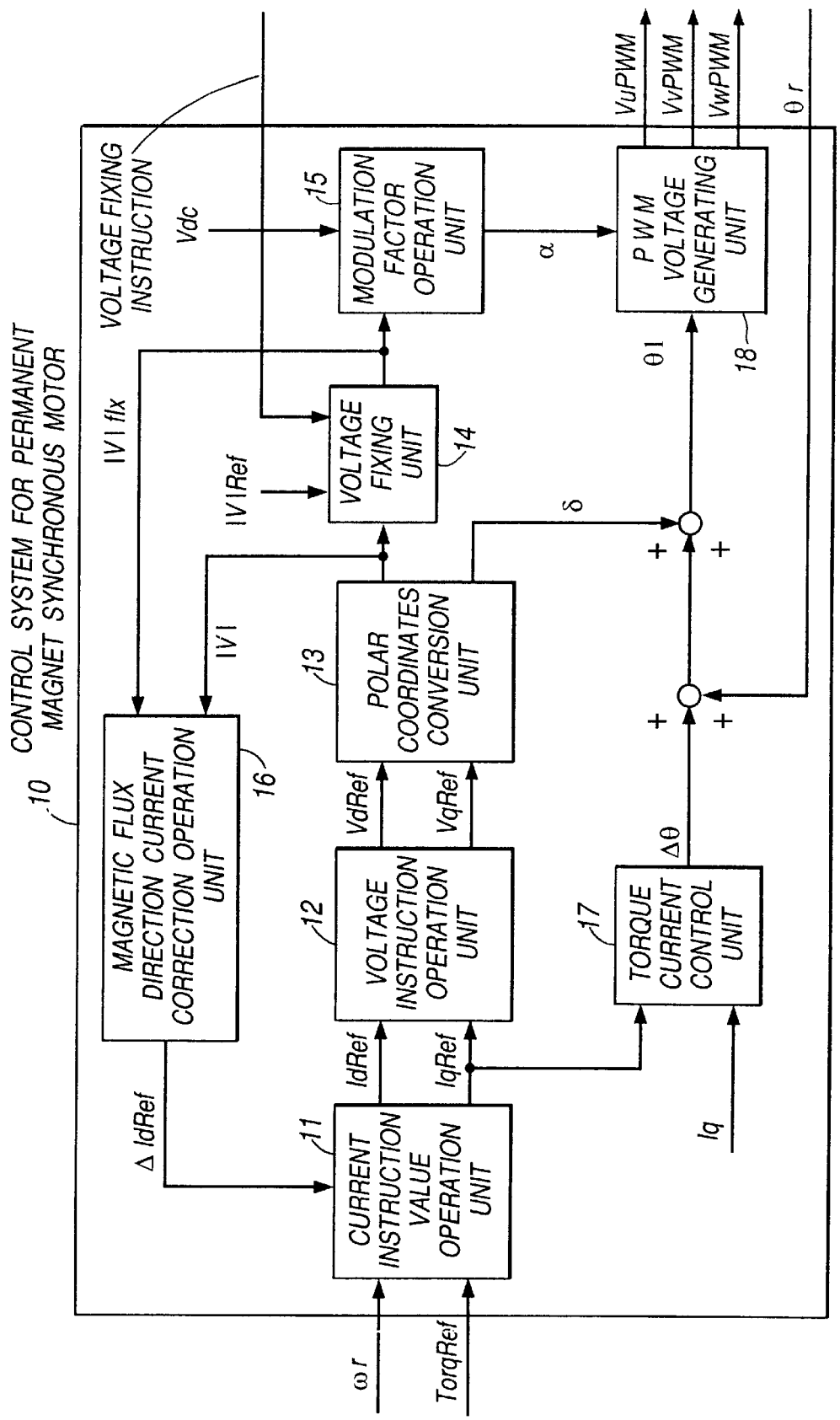
FIG. 1 is a functional block diagram of the first actual configuration of a control system.
Figure 2:
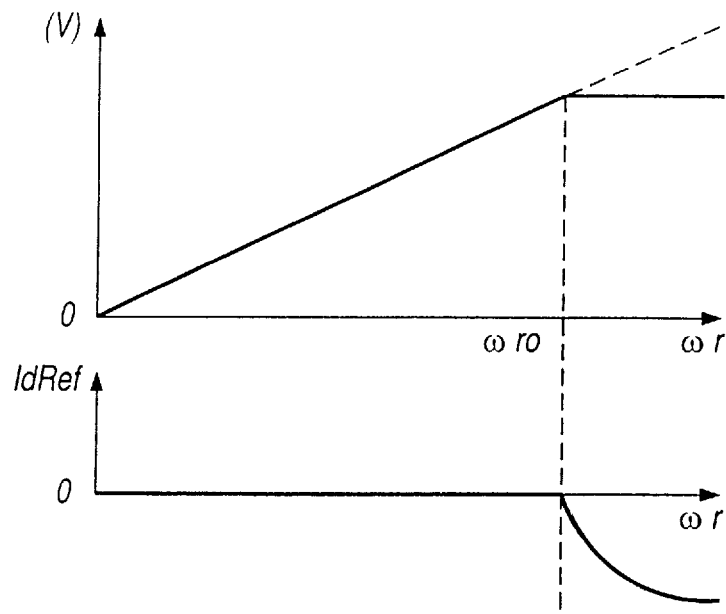
FIG. 2 is a diagram of the relationship between the magnetic flux direction current instruction and the motor angular frequency for the first actual configuration.
Figure 3:
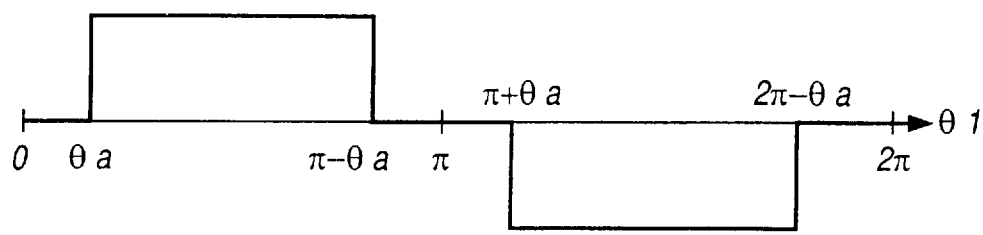
FIG. 3 is a PWM voltage waveform diagram for the first actual configuration.

A first actual configuration of this invention is described using FIGS. 1 to 3.

FIG. 1 is a schematic diagram of a control system for a permanent magnet synchronous motor which is the first actual configuration of this invention.

Control system 10 for a permanent magnet synchronous motor is composed of a current instruction value operation unit 11, voltage instruction operation unit 12, polar coordinates conversion unit 13, voltage fixing unit 14, modulation factor operation unit 15, magnetic flux direction current correction value operation unit 16, torque current control unit 17 and a PWM voltage generating unit 18. Here, the word of instruction means reference.

In current instruction value operation unit 11, a motor angular frequency $\omega r$, torque instruction value TorqRef and magnetic flux correction value $\Delta$IdRef, which is the output of the magnetic flux direction current correction value operation unit 16 described below, are taken as inputs. Magnetic flux direction current instruction IdRef and torque direction current instruction IqRef are outputted by the operations of the following equations. Here, the permanent magnet magnetic flux direction is taken as the d axis, and the direction at right angles to that is taken as the q axis.

Expressions 1

$$IdRef = \frac{(\omega r0 - \omega r) * \Phi f}{\omega r * Ld} + \Delta IdRef \quad (\omega r \geq \omega r0)$$

$$IdRef = \Delta IdRef \quad (\omega r < \omega r0)$$

$$IqRef = \frac{TorqRef}{\Phi f + (Ld - Lq) * IdRef}$$

Here,
 $\omega r0$: constant angular frequency
 $\Phi f$: permanent magnet magnetic flux
 Ld: d axis inductance
 Lq: q axis inductance These are predetermined in the current instruction value operation unit 11.

Voltage instruction operation unit 12 takes as inputs the magnetic flux direction current instruction IdRef and torque direction current instruction IqRef which are outputted from the current instruction operation unit 11. It finds and outputs a magnetic flux direction voltage instruction VdRef and torque direction voltage instruction VqRef using the operations in the following equations.

Expressions 2

$$VdRef = Rd * IdRef - \omega r * Lq * IqRef + Ld * \frac{dIdRef}{dt}$$

$$VqRef = Rq * IqRef - \omega r * Ld * IdRef + Lq * \frac{dIqRef}{dt}$$

Here,
 Rd: d axis resistance
 Rq: q axis resistance

Lq,Ld,Rd,Rq are predetermined in the voltage instruction operation unit 12.

Polar coordinates conversion unit 13 takes as its inputs the magnetic flux direction voltage instruction VdRef and torque direction voltage instruction VqRef outputted from the voltage instruction operation unit 12. It outputs a voltage vector size or length |V| and voltage vector angle $\delta$ to the magnetic flux direction, using the operations in the following equations.

Expressions 3

$$|V| = \sqrt{VdRef^2 + VqRef^2}$$

$$\delta = \begin{cases} \cos^{-1}(VdRef/|V|) \ldots (VqRef \geq 0) \\ -\cos^{-1}(VdRef/|V|) \ldots (VqRef < 0) \end{cases}$$

Voltage fixing unit 14 takes as its inputs voltage vector size |V| outputted from the polar coordinates conversion unit 13, voltage vector size instruction value |V|Ref and voltage fixing instruction Vfix. It operates and outputs a fresh voltage vector size |V|fix according to a voltage fixing instruction Vfix.

Voltage fixing instruction Vfix is "1" when the voltage vector size is fixed to instruction value |V|Ref, and is "0" when the voltage vector size is not fixed to instruction value |V|Ref, According to the value of voltage fixing instruction Vfix, the voltage fixing unit 14 outputs

|V|fix=|V|Ref when the voltage fixing instruction Vfix is 1

|V|fix=|V| when the voltage fixing instruction is 0.

Magnetic flux direction current correction value operation unit 16 takes as its inputs voltage vector |V|, which is outputted from the polar coordinates conversion unit 13, and voltage vector size |V|fix, which is outputted from the voltage fixing unit 14. It operates a magnetic flux direction current correction value ΔIdRef using proportional-plus-integral control.

Expressions 4

$$\Delta IdRef = \frac{Kpd * s + Kid}{s} * (|V|fix - |V|)$$

Here, s: differential operator
Kpd: proportional gain
Kid: integral gain

Kpd, Kid are predetermined in the magnetic flux direction current correction value operation unit 16.

Torque current control unit 17 takes as its inputs torque direction current instruction IqRef, outputted from current instruction value operation unit 11, and a torque current actual value Iq. It outputs a torque angle correction value Δθ using the proportional-plus-integral control expressed by the following equations.

Expressions 5

$$\Delta\theta = \frac{Kp * s + ki}{s} * (IqRef - Iq)$$

Here, s: differential operator
Kp: proportional gain
Ki: integral gain

Kp,Ki are predetermined in the torque current control unit 17.

Modulation factor operation unit 15 takes as its inputs voltage vector size |V|fix, outputted from the voltage fixing unit 14, and a PWM inverter DC link voltage Vdc. It outputs a modulation factor a using the following operation.

Expression 6

$$\alpha = \frac{|V|fix}{Vdc * \frac{2\sqrt{3/2}}{\pi}}$$

The operation of PWM voltage generating unit 18 is described using FIG. 3.

PWM voltage generating unit 18 takes as its inputs inverter phase θ1 which is the sum of torque angle correction value Δθ, outputted from the torque current control unit 17, permanent magnet magnetic flux angle, that is to say rotor phase θr, and voltage vector angle δ, outputted from the polar coordinates conversion unit 13, and the modulation factor α outputted from modulation factor operation unit 15. It outputs 3-phase PWM voltage instructions VuPWM, VvPWM and VwPWM through the following operations. Here, rotor phase θr is differentiated with a speed operation unit (not shown), in which the motor angular frequency ωr is obtained.

Here, a case of driving a permanent magnet synchronous motor using an NPC inverter is described as an example.

First, using the inputted inverter phase θ1, inverter phases θu, θv and θw of respective phases U, V and W are operated by the following equations.

Expressions 7

θu=θ1+π/2

θv=θ1+π/2−2π/3

θw=θ1+π/2−4π/3

Then, using U-phase inverter phase θu, U-phase PWM voltage instruction VuPWM is outputted through the following operation.

Expressions 8

$$VuPWM = \begin{bmatrix} 0 \ldots (0 \leq \theta u < \theta a, \pi - \theta a \leq \theta u < \pi + \theta a, 2\pi - \theta a \leq \theta v < 2\pi) \\ +Vdc/2 \ldots (\theta a \leq \theta u < \pi - \theta a) \\ -Vdc/2 \ldots (\pi + \theta a \leq \theta u < 2\pi - \theta a) \end{bmatrix}$$

Here, θa = cos⁻¹(α)

In the same way, V-phase PWM voltage instruction VvPWM and W-phase voltage instruction VwPWM are outputted in the following manner.

Expressions 9

$$VvPWM = \begin{bmatrix} 0 \ldots (0 \leq \theta v < \\ \theta a, \pi - \theta a \leq \theta v < \pi + \theta a, 2\pi - \theta a \leq \theta v < 2\pi) \\ +Vdc/2 \ldots (\theta a \leq \theta v < \pi - \theta a) \\ -Vdc/2 \ldots (\pi + \theta a \leq \theta v < 2\pi - \theta a) \end{bmatrix}$$

$$VwPWM = \begin{bmatrix} 0 \ldots \\ (0 \leq \theta w < \theta a, \pi - \theta a \leq \theta w < \pi + \theta a, 2\pi - \theta a \leq \theta w < 2\pi) \\ +Vdc/2 \ldots (\theta a \leq \theta w < \pi - \theta a) \\ -Vdc/2 \ldots (\pi + \theta a \leq \theta w < 2\pi - \theta a) \end{bmatrix}$$

The pulse waveform at this time is as shown in FIG. 3.

Also, the permanent magnet synchronous motor is controlled by controlling the NPC output voltage using the above PWM voltage instructions.

With a control system for a permanent magnet synchronous motor composed in this way, as shown in FIG. 2, if the motor revolution frequency exceeds a specified value, the voltage vector size is made a specified voltage vector size, and the modulation factor is found based on that value. At the same time, the magnetic flux direction current correction value is found based on the voltage vector size from the polar coordinates conversion unit and the specified voltage vector size. By correcting the magnetic flux direction current instruction using that value, the stability of the current control system can be ensured, even if the motor terminal voltage exceeds the maximum output voltage of the power conversion system.

Figure 4:
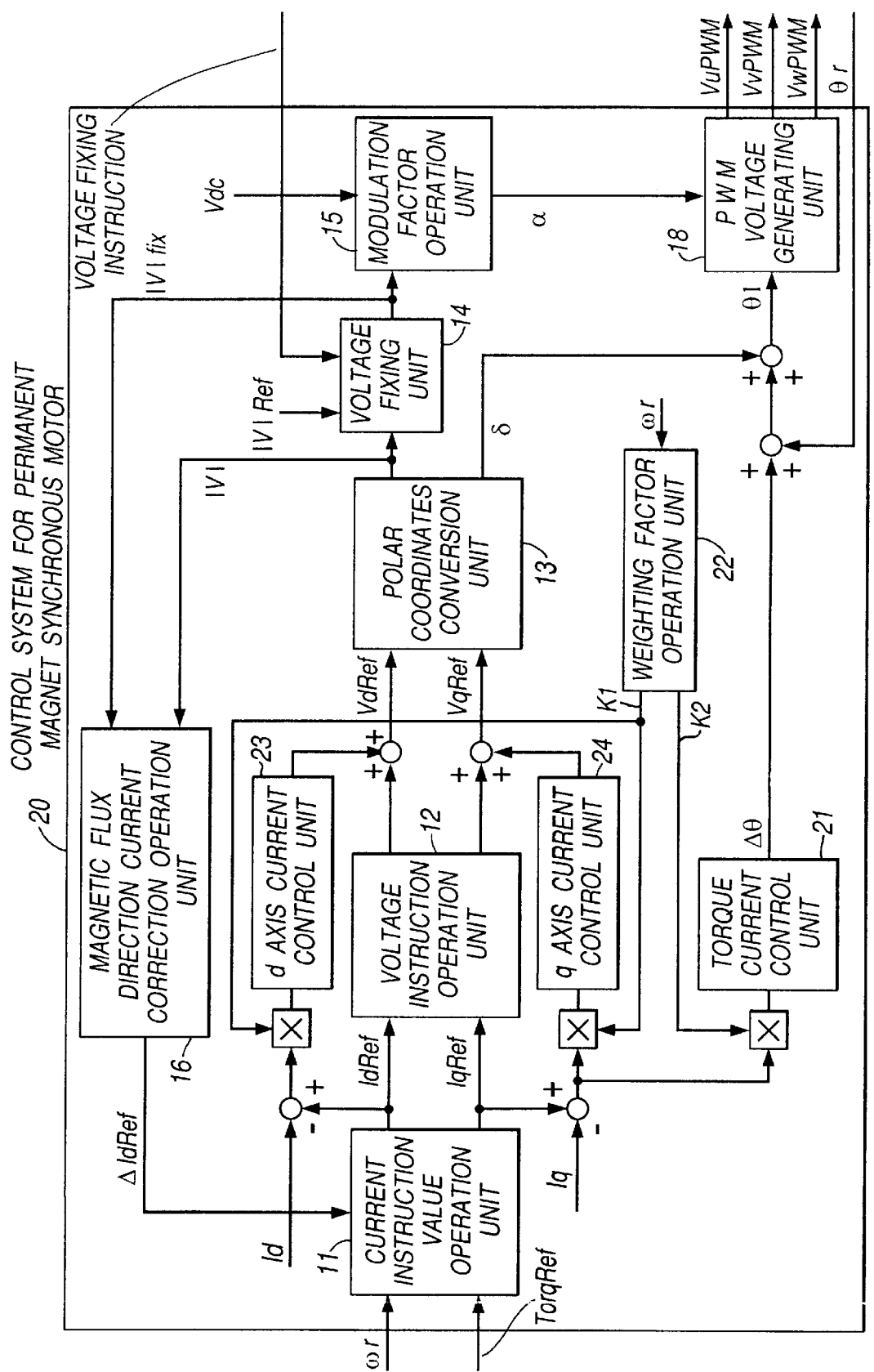
FIG. 4 is a functional block diagram of the second actual configuration of a control system.
Figure 5:
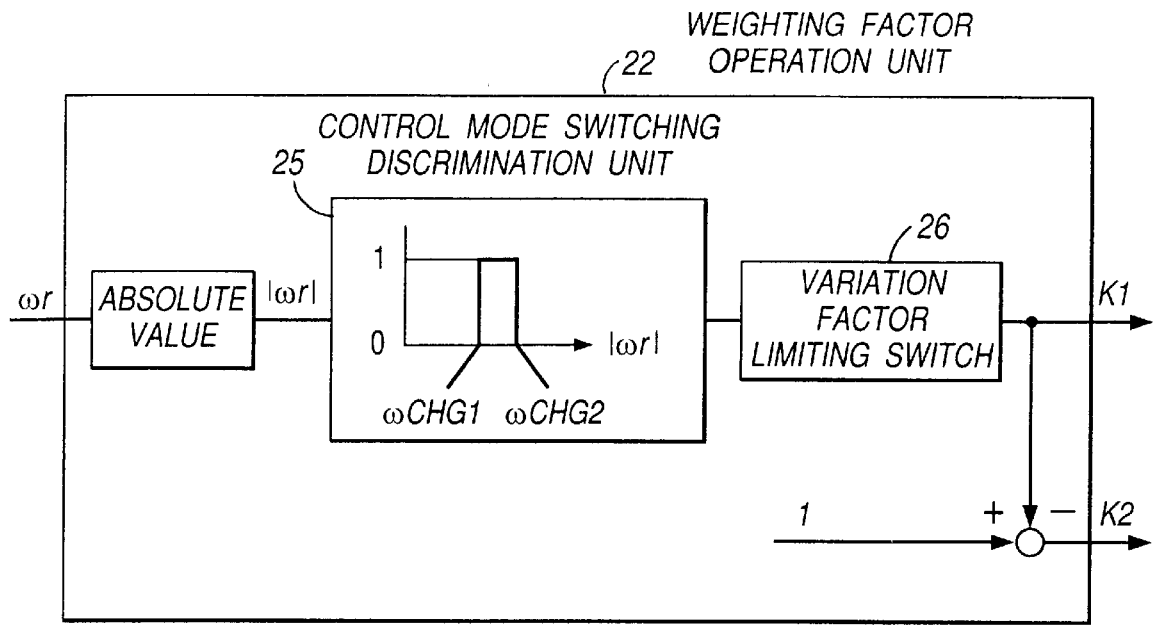
FIG. 5 is a functional block diagram of the weighting factor operation unit of the second actual configuration.
Figure 6:
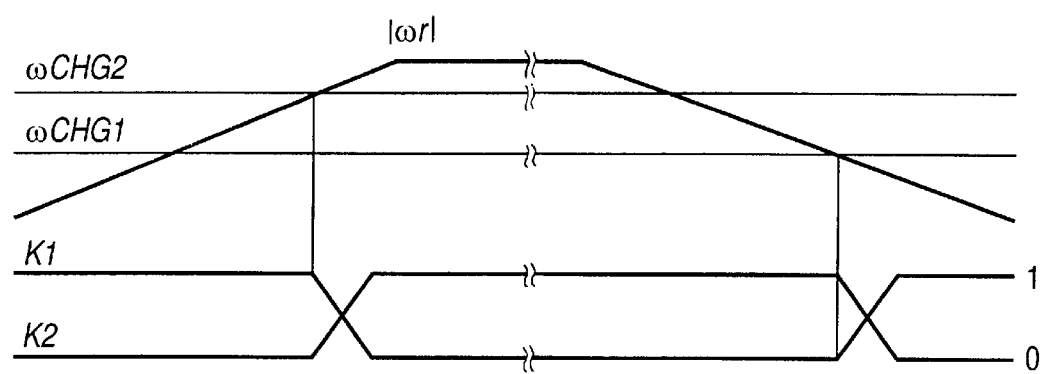
FIG. 6 is an operation diagram of the weighting factor operation unit of the second actual configuration.

The following is a description of a second actual configuration of this invention using FIGS. 4 to 6.

In the second actual configuration, control system 20 for a permanent magnet synchronous motor is composed of current instruction value operation unit 11, voltage instruction operation unit 12, polar coordinates conversion unit 13, voltage fixing unit 14, modulation factor operation unit 15, magnetic flux direction current correction value operation unit 16, torque current control unit 21, PWM voltage generating unit 18, weighting factor operation unit 22, d axis current control unit 23 and q axis current control unit 24.

The operations of current instruction value operation unit 11, voltage instruction operation unit 12, polar coordinates conversion unit 13, voltage fixing unit 14, modulation factor operation unit 15, magnetic flux direction current correction value operation unit 16 and PWM voltage generating unit 18 are the same as in the first actual configuration.

Weighting factor operation unit 22 is described using FIGS. 5 and 6.

Weighting factor operation unit 22 is composed of a control mode switching discrimination unit 25 and a variation factor limiting unit 26.

Control mode switching discrimination unit 25 takes as its input an absolute value |ωr| of inverter angular frequency ωr. It outputs control mode Cmode through the following condition discrimination.

The control modes are taken as Cmode=0 when in constant voltage control and Cmode=1 when in variable voltage control.

When the existing control mode is Cmode=0,
Expressions 10

*If*|ωr|≧ωCHG1, Cmode=0

*If*|ωr|<ωCHG1, Cmode=0

When the existing control mode is Cmode=1,
Expressions 11

*If*|ωr|≧ωCHG2, Cmode=0

*If*|ωr|≧ωCHG2, Cmode=1

Here, it is taken that ωCHG1≦ωCHG2.

Variation factor limiting unit 26 takes as its input control mode Cmode outputted from the control mode switching discrimination unit 25. It outputs values which apply limits to the rising and falling speeds of Cmode, taking the weighting factor as K1. Weighting factor K2 falls and rises according to the rising and falling speeds of weighting factor K1.

In the case when control mode Cmode has changed from 0 to 1 at t=0, if the limiting value of the variation factor is taken as (a) weighting factor K1 and weighting factor K2 will vary as follows.
Expressions 12

| When t < 0 | K1 = 0 | K2 = 1 |
| When 0 ≦ t < 1/a | K1 = a *t | K2 = 1 − a * t |
| When 1/a ≦ t | K1 = 1 | K2 = 0 |

In the case when the control mode Cmode has changed from 1 to 0 at t=0, also, in the same way,
Expressions 13

| When t < 0 | K1 = 1 | K2 = 0 |
| When 0 ≦ t < 1/a | K1 = 1 − a *t | K2 = a * t |
| When 1/a ≦ t | K1 = 0 | K2 = 1 |

The d axis current control unit 23 takes as its input a value which is the value of magnetic flux current actual value Id subtracted from magnetic flux direction current instruction IdRef outputted from the current instruction value operation unit 11 multiplied by weighting factor K1 outputted from the weighting factor operation unit 22. It outputs magnetic flux direction voltage correction value ΔVd through the proportional-plus-integral control expressed by the following equation.

Expression 14

$$\Delta Vd = \frac{Gp * s + Gi}{s} * K1 * (IdRef - Id)$$

Here,
s: differential operator
Gp predetermined proportional gain,
Gi: predetermined integral gain This output ΔVd of the d axis current control unit 23 is added to magnetic flux direction voltage instruction VdRef outputted from the voltage instruction operation unit 12. The result is inputted to the polar coordinates conversion unit 13 as the new magnetic flux direction voltage instruction VdRef.

The q axis current control unit 24 takes as its input a value which is the value of torque current actual value Iq subtracted from torque direction current instruction IqRef outputted from the current instruction value operation unit 11 multiplied by weighting factor K1 outputted from the weighting factor operation unit 22. It outputs torque direction voltage correction value ΔVq through the proportional-plus-integral control expressed by the following equation.

Expression 15

$$\Delta Vq = \frac{Gp * s + Gi}{s} * K1 * (IqRef - Iq)$$

Here,
s: differential operator
Gp: proportional gain,
Gi: integral gain
Gp,Gi are predetermined in the q axis current control unit 24.

This output ΔVq of the q axis current control unit 24 is added to torque direction voltage instruction VqRef outputted from the voltage instruction operation unit 12. The result is inputted to the polar coordinates conversion unit 13 as a fresh torque direction voltage instruction VqRef.

Torque current control unit 21 takes as its input a value which is the value of torque current actual value Iq subtracted from torque direction current instruction IqRef outputted from the current instruction value operation unit 11 multiplied by weighting factor K2 outputted from the weighting factor operation unit 22. It outputs torque angle correction value Δθ through the proportional-plus-integral control expressed by the following equation.

Expression 16

$$\Delta\theta = \frac{Kp * s + Ki}{s} * K2 * (IqRef - Iq)$$

Here,
s: differential operator
Kp: proportional gain,
Ki integral gain
Kp,Ki are predetermined in the torque current control unit 21.

With a control system for a permanent magnet synchronous motor composed in this way, if the motor revolution frequency exceeds a specified value, the voltage vector size is made a specified voltage vector size, and the modulation factor is found based on that value. At the same time, the magnetic flux direction current correction value is found based on the voltage vector size from the polar coordinates conversion unit and the specified voltage vector size. By correcting the magnetic flux direction current instruction using that value, the stability of the current control system can be ensured, even if the motor terminal voltage exceeds the maximum output voltage of the power conversion system. In addition, during transition between variable voltage control and fixed voltage control, by gradually varying the weighting, transition between variable voltage control and fixed voltage control can be performed smoothly.

Figure 7:
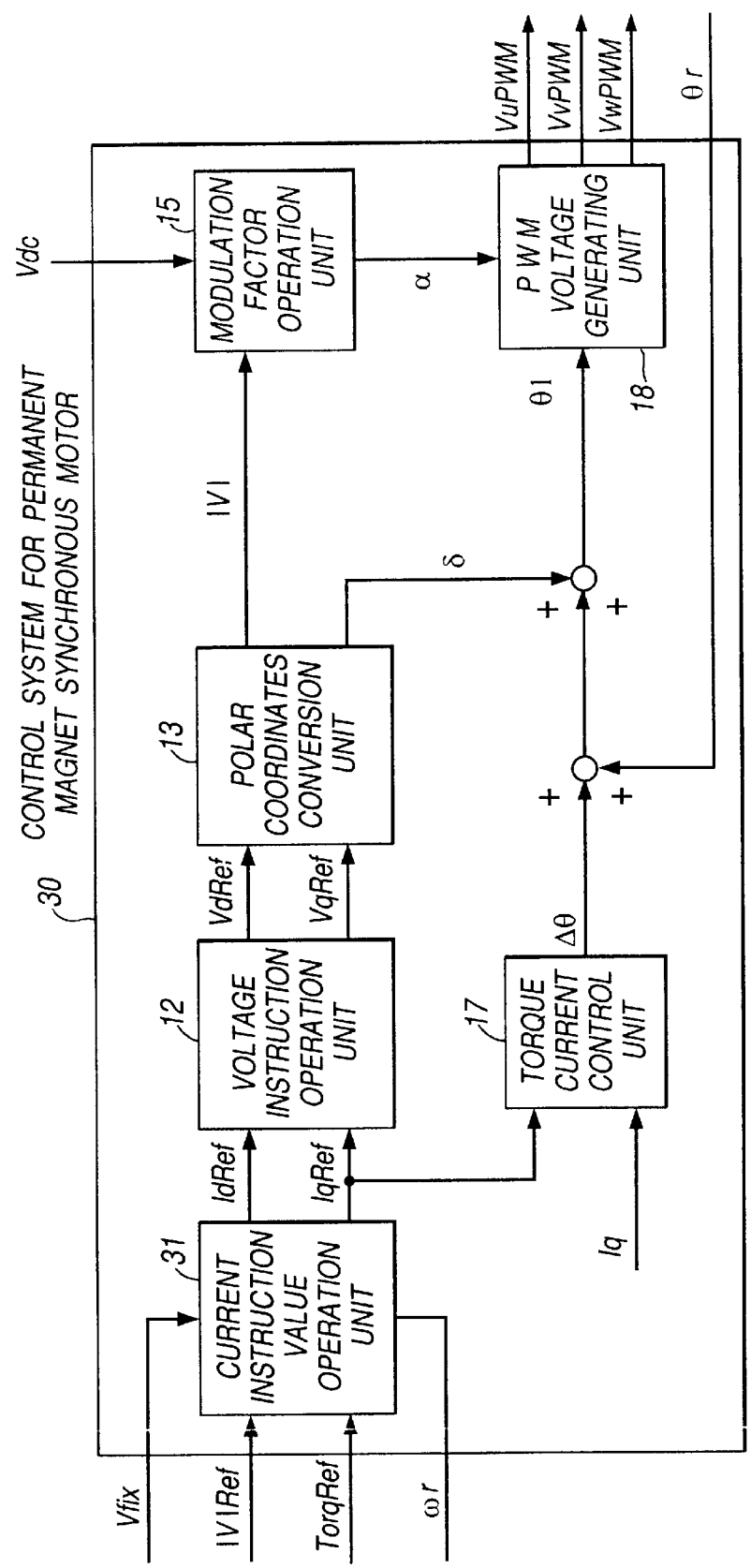
FIG. 7 is a functional block diagram of the third actual configuration of a control system.

The following is a description of a third actual configuration of this invention using FIG. 7.

In the third actual configuration, control system 30 for a permanent magnet synchronous motor is composed of current instruction value operation unit 31, voltage instruction operation unit 12, polar coordinates conversion unit 13, modulation factor operation unit 15, torque current control unit 17 and PWM voltage generating unit 18.

In this composition, the operations of the voltage instruction operation unit 12, polar coordinates conversion unit 13, modulation factor operation unit 15, torque current control unit 17 and PWM voltage generating unit 18 are the same as in the first actual configuration and their descriptions have therefore been omitted. However, voltage vector size |V| outputted from polar coordinates conversion unit 13 is inputted to the modulation factor operation unit 15.

Current instruction value operation unit 31 takes as its inputs voltage vector size instruction |V|Ref, torque instruction TorqRef, motor angular frequency r and voltage fixing instruction Vfix. It outputs magnetic flux direction current instruction IdRef and torque direction current instruction IqRef by the following two operating methods depending on the value of voltage fixing instruction Vfix.

For voltage fixing instruction Vfix, when the voltage vector size is fixed: Vfix=1, when the voltage vector size is not fixed Vfix=0.

First, in the case when voltage fixing instruction Vfix=1, torque instruction TorqRef, voltage vector size instruction |V|Ref and motor angular frequency r are taken as parameters, and magnetic flux direction current instruction IdRef and torque direction current instruction IqRef, which were stored beforehand, are outputted.

The conditions which IdRef and IqRef should fullfil at this time are

Expressions 17

$$(\Phi f + Ld^* IdRef)^2 + (Lq^* IqRef)^2 = (|V|Ref/\omega r)^2$$

$$(\Phi f + (Ld - Lq)^* IdRef)^* IqRef = TorqRef$$

Here,

Φf: permanent magnet magnetic flux

Ld: d axis inductance

Lq: q axis inductance

These are predetermined in the current instruction value operation unit 31.

Also, in the case when voltage fixing instruction Vfix=0, torque instruction value TorqRef and motor angular frequency r are taken as inputs, and magnetic flux direction current instruction IdRef and torque direction current instruction IqRef are outputted using the calculations in the following equations.

Expressions 18

$$IdRef = \frac{(\omega r0 - \omega r)^* \Phi f}{\omega r^* Ld} + \Delta IdRef \quad (\omega r \geq \omega r0)$$

$$IdRef = -\Delta IdRef \quad (\omega r < \omega r0)$$

$$IqRef = \frac{TorqRef}{\Phi f + (Ld - Lq)^* IdRef}$$

Here,

ωr0: constant angular frequency

Φf: permanent magnet magnetic flux

Ld: d axis inductance

Lq: q axis inductance

These are predetermined in the current instruction value operation unit 31.

With a control system for a permanent magnet synchronous motor composed in this way, in the current instruction value operation unit, the magnetic flux direction current instruction and the torque direction current instruction are operated by two operation methods, one, when the motor revolution frequency exceeds a specified value, and the other, when it does not exceed that value. In the case of the motor revolution frequency exceeding the specified value, by correcting the magnetic flux direction current instruction, the stability of the current control system can be ensured, even if the motor terminal voltage exceeds the maximum output voltage of the power conversion system.

Figure 8:
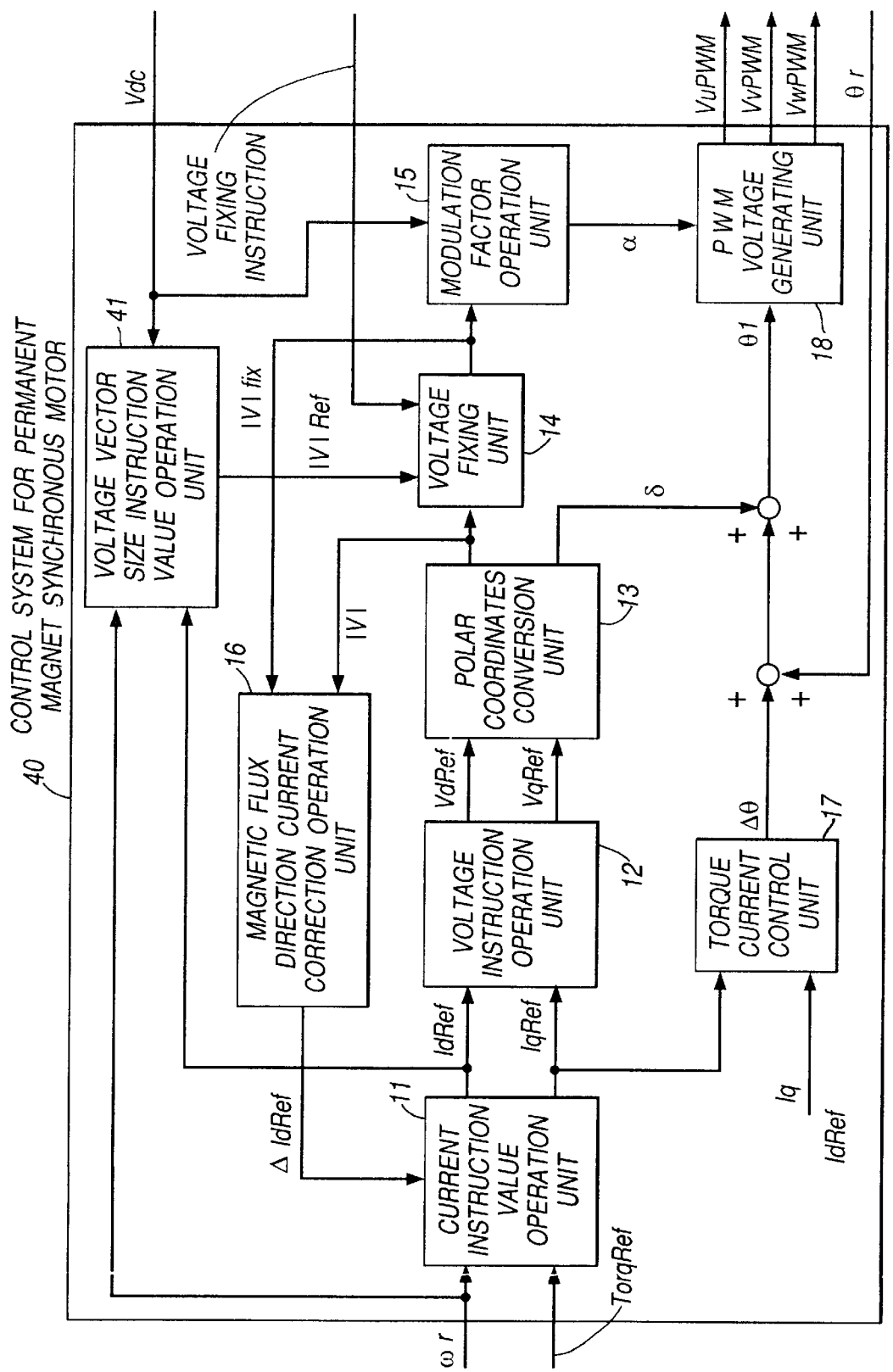
FIG. 8 is a functional block diagram of the fourth actual configuration of a control system.
Figure 9:
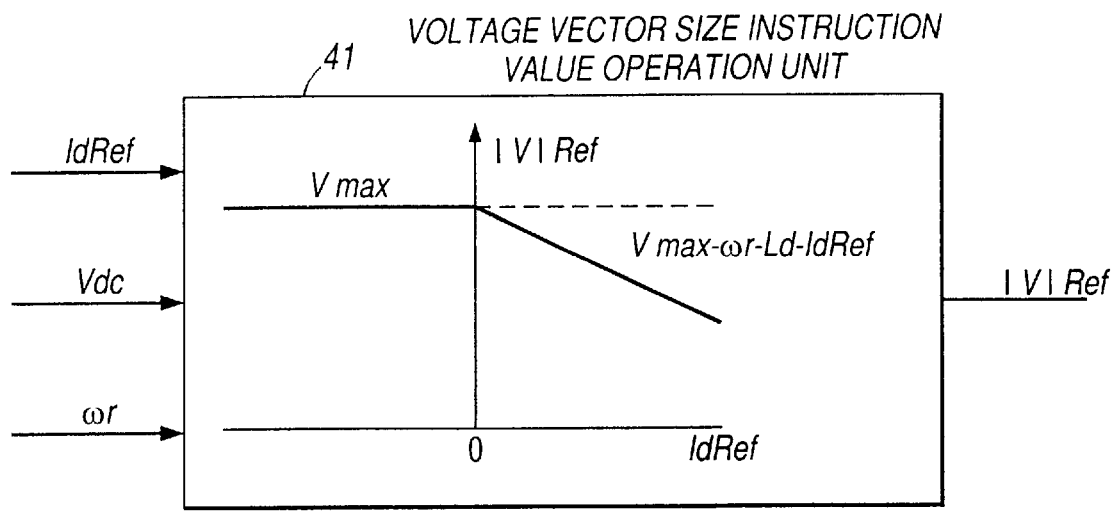
FIG. 9 is an operation diagram of the voltage vector size instruction value operation unit of the fourth actual configuration.

Next, a fourth actual configuration of this invention is described using FIGS. 8 and 9.

Control system 40 for a permanent magnet synchronous motor of the fourth actual configuration is composed of current instruction value operation unit 11, voltage instruction operation unit 12, polar coordinates conversion unit 13, voltage fixing unit 14, modulation factor operation unit 15, magnetic flux direction current correction value operation unit 16, torque current control unit 17, PWM voltage generating unit 18 and voltage vector size instruction value operation unit 41.

In this composition, the operations of current instruction value operation unit 11, voltage instruction operation unit 12, polar coordinates conversion unit 13, voltage fixing unit 14, modulation factor operation unit 15, magnetic flux direction current correction value operation unit 16, torque current control unit 17 and PWM voltage generating unit 18 are the same as in the first actual configuration.

Voltage vector size instruction value operation unit 41 takes as its inputs inverter DC link voltage Vdc, magnetic flux direction current instruction IdRef outputted from the current instruction value operation unit 11 and motor angular frequency ωr. It sets and outputs voltage vector size instruction |V|Ref based on the following equations.

Expressions 19

$$\text{When } IdRef \leq 0: |V|Ref = \frac{6}{\pi} * Vdc$$

$$\text{When } IdRef > 0: |V|Ref = \frac{6}{\pi} * Vdc - \omega r * Ld * IdRef$$

Ld is predetermined in the voltage vector size instruction value operation unit 41.

This voltage vector size instruction |V|Ref has the type of relationship shown in FIG. 9.

This voltage vector size instruction |V|Ref is inputted to the voltage fixing unit 14.

By composing the system in this way, when magnetic flux direction current instruction IdRef takes a positive value, it is judged that the inverter DC link voltage has become larger due to fluctuation of the DC power source. Then, by reducing voltage vector size instruction value |V|Ref so that the magnetic flux direction current becomes roughly zero, there is no wasteful passing of magnetic flux direction current.

Figure 10:
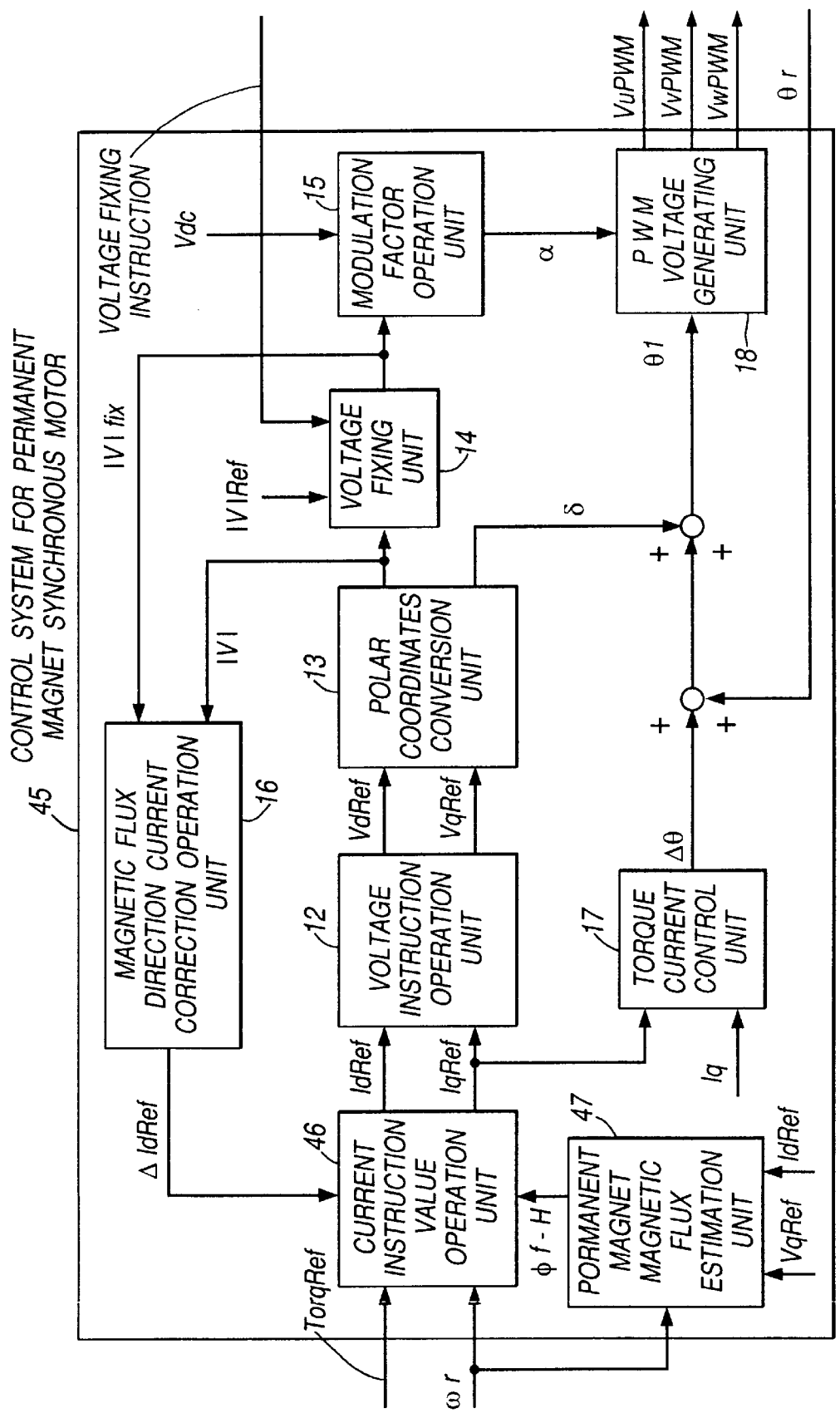
FIG. 10 is a functional block diagram of the fifth actual configuration of a control system.
Figure 12:
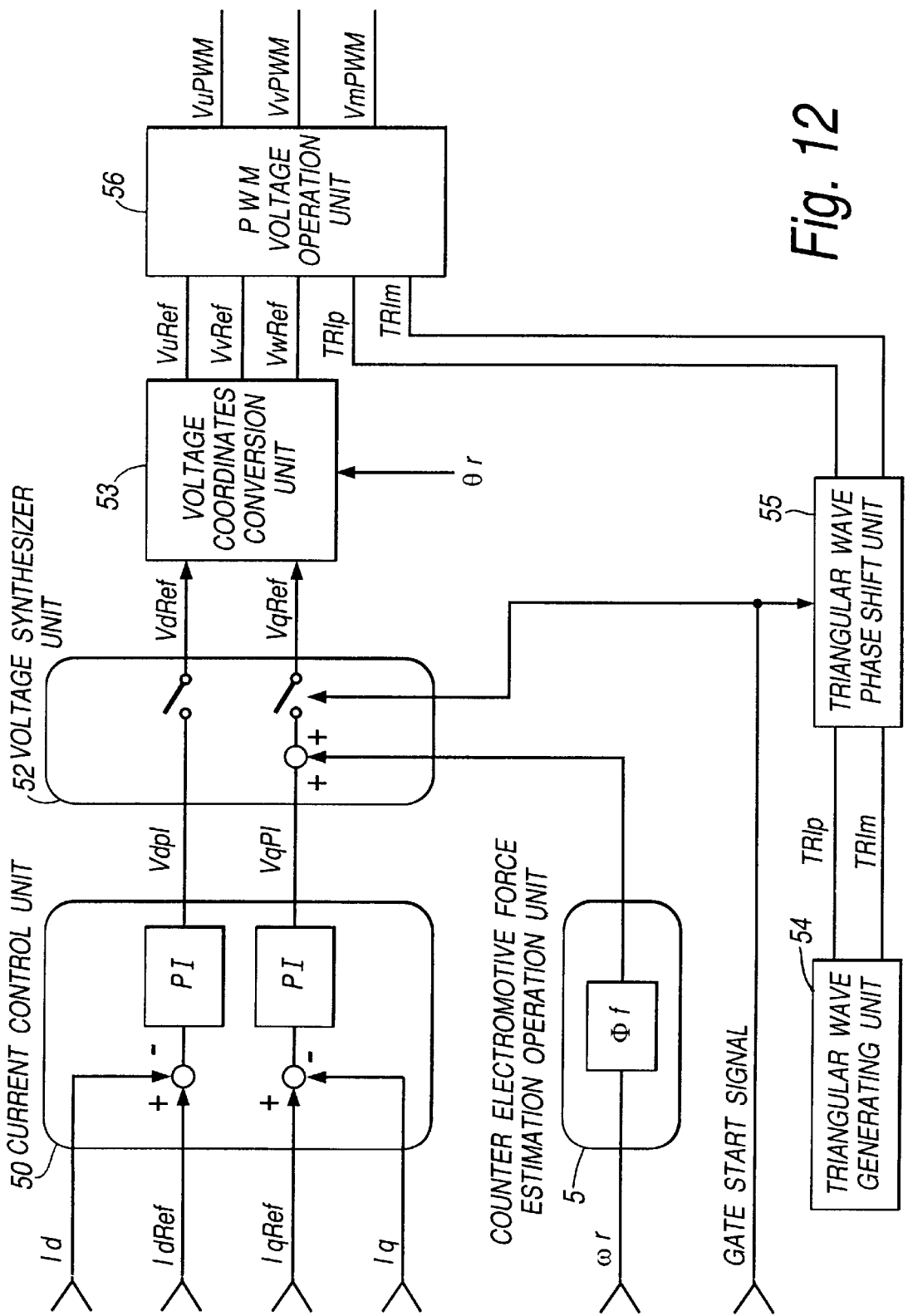
FIG. 12 is a functional block diagram of the seventh actual configuration of a control system.

Next, a fifth actual configuration of this invention is described using FIG. 10.

Control system 45 for a permanent magnet synchronous motor of the fifth actual configuration is composed of current instruction operation value unit 46, voltage instruction operation unit 12, polar coordinates conversion unit 13, voltage fixing unit 14, modulation factor operation unit 15, magnetic flux direction current correction value operation unit 16, torque current control unit 17, PWM voltage generating unit 18 and permanent magnet magnetic flux estimation unit 47.

In this composition, the operations of voltage instruction operation unit 12, polar coordinates conversion unit 13, voltage fixing unit 14, modulation factor operation unit 15, magnetic flux direction current correction value operation unit 16, torque current control unit 17 and PWM voltage generating unit 18 are the same as in the first actual configuration.

Permanent magnet magnetic flux estimation unit 47 takes as its inputs magnetic flux direction current instruction IdRef outputted from the current instruction value operation unit 46, torque direction voltage instruction VqRef outputted from the voltage instruction operation unit 12 and motor angular frequency ωr. It outputs permanent magnet magnetic flux estimated value $\Phi f_{13} H$ through the following operation.

Expression 20

$$\Phi f\_H = G(s) * \frac{VqRef}{\omega r} \, Ld * IdRef$$

Here, $G(s) = 1/(1+Tf*s)$ s: differential operator,
Ld: d axis inductance
Tf: filter time constant (a smaller value than the temperature variation time constant of the permanent magnet)

Ld,Tf are predetermined in permanent magnet magnetic flux estimation unit 47.

Current instruction value operation unit 46 takes as its inputs motor angular frequency ωr, torque instruction TorqRef, magnetic flux direction current correction value IdRef outputted from the magnetic flux direction current correction value operation unit 16, and permanent magnet magnetic flux estimated value Φf_H outputted from permanent magnet magnetic flux estimation unit 47. It outputs magnetic flux direction current instruction IdRef and torque direction current instruction IqRef through the following operations.

Expressions 21

$$IdRef = \frac{(\omega r0 - \omega r) * \Phi f\_H}{\omega r * Ld} + \Delta IdRef \quad (\omega r \geq \omega r0)$$

$$IdRef = -\Delta IdRef \quad (\omega r < \omega r0)$$

$$IqRef = \frac{TorqRef}{\Phi f\_H + (Ld - Lq) * IdRef}$$

Here,
ωr0: constant angular frequency
Ld: d axis inductance, Lq: q axis inductance
These are predetermined in the current instruction value operation unit 46.

The permanent magnet magnetic flux is found by operation in this way. By exercising control using that value, the output torque can be made to follow the torque instruction, even if the magnetic flux of the permanent magnet varies due to the temperature.

Figure 11:
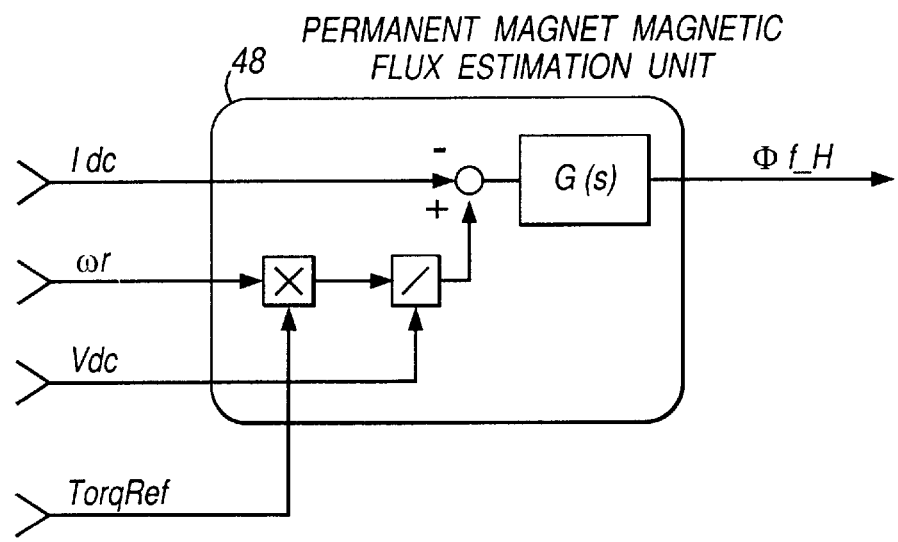
FIG. 11 is a functional block diagram of the permanent magnet magnetic flux estimation unit of the sixth actual configuration.

The following is a description of a sixth actual configuration of this invention using FIG. 11.

The sixth actual configuration is another actual configuration of the permanent magnet magnetic flux estimation unit of the fifth actual configuration.

Permanent magnet magnetic flux estimation unit 48 takes as its inputs inverter DC link voltage Vdc, inverter DC input current Idc, torque instruction TorqRef and motor angular frequency ωr. It outputs permanent magnet magnetic flux estimated value Φf_H by estimating the magnetic flux of the permanent magnet through the following operation.

Expression 22

$$\Phi f\_H = G(s) * Idc - \frac{\omega r * TorqRef}{Vdc}$$

Here,
s: differential operator
G(s): control gain

G(s) is predetermined in the permanent magnet magnetic flux estimation unit 48.

The permanent magnet magnetic flux is found by operation in this way. By exercising control using that value, the output torque can be made to follow the torque instruction, even if the magnetic flux of the permanent magnet varies due to the temperature.

The following is a description of a seventh actual configuration of this invention using FIGS. 12 to 15.

The control system for a permanent magnet synchronous motor of the seventh actual configuration is composed of current control unit 50, counter electromotive force estimation operation unit 51, voltage synthesizer unit 52, voltage coordinates conversion unit 53, triangular wave generating unit 54, triangular wave phase shift unit 55 and PWM voltage operation unit 56.

Current control unit 50 takes as its inputs magnetic flux direction current instruction IdRef, magnetic flux direction current actual value Id, torque direction current instruction value IqRef and torque current actual value Iq. It outputs magnetic flux direction PI control voltage instruction VdPI and torque direction PI control voltage instruction VqPI through the proportional-plus-integral control shown below.

Expressions 23

$$VdPI = \frac{Gp * s + Gi}{s} * (IdRef - Id)$$

$$VqPI = \frac{Gp * s + Gi}{s} * (IqRef - Iq)$$

Here,
s: differential operator
Gp: proportional gain, Gi integral gain
GP,Gi are predetermined in current control unit 50.

Counter electromotive force estimation operation unit 51 takes as its input motor angular frequency ωr. It outputs counter electromotive force estimated value Vq_H through the following equation.

Expression 24

$$Vq\_H = \Phi f * \omega r$$

Here, Φf: permanent magnet magnetic flux
Φf is predetermined in the current electromotive force estimation operation unit 51.

Voltage synthesizer unit 52 takes as its inputs magnetic flux direction PI control voltage instruction VdPI and torque direction PI control voltage instruction VqPI outputted from the current control unit 50, counter electromotive force estimated value Vq_H outputted from the counter electromotive force estimation operation unit 51 and gate start signal Gst. It outputs magnetic flux direction voltage instruction VdRef and torque direction voltage instruction VqRef through the following operations.

Gate start signal Gst is taken as during power running (when gate ON instruction): Gst=1 during coasting (when gate OFF instruction): Gst=0

Expressions 25

When Gst=1: VdRef=VDPI $$VqRef=VqPI+Vq\_H$$

When Gst=0: VdRef=0

$$VqRef=0$$

Voltage coordinates conversion unit 53 takes as its inputs magnetic flux direction voltage instruction VdRef and torque direction voltage instruction VqRef outputted from the voltage synthesizer unit 52 and motor magnetic flux angle θr. It outputs 3-phase voltage instructions VuRef, VvRef and VwRef through the following operations.

Expressions 26

$$VuRef = \frac{2}{3} * (VdRef * \cos\theta r - VqRef * \sin\theta r)$$

$$VvRef = \frac{2}{3} * \left( VdRef * \cos\left(\theta r - \frac{2\pi}{3}\right) - VdRef * \sin\left(\theta r - \frac{2\pi}{3}\right) \right)$$

$$VwRef = -VuRef - VvRef$$

Triangular wave generating unit 54 outputs the two positive and negative constant frequency triangular waves TRIp and TRIm for an NPC inverter shown in the following equations.

Expressions 27

$$\text{When } 0 \leq \omega sw * t < \pi : TRIp = \frac{Vdc}{2} * \left(1 - \frac{\omega sw * t}{\pi}\right)$$

$$TRIm = \frac{-Vdc}{2} * \frac{\omega sw * t}{\pi}$$

$$\text{When } \pi \leq \omega sw * t < 2\pi : TRIp = \frac{Vdc}{2} * \left(1 - \frac{\omega sw * t}{\pi} - 1\right)$$

$$TRIm = \frac{Vdc}{2} * \left(\frac{\omega sw * t}{\pi} - 2\right)$$

Wsw is predetermined in triangular wave generating unit 54.

Figure 13A:
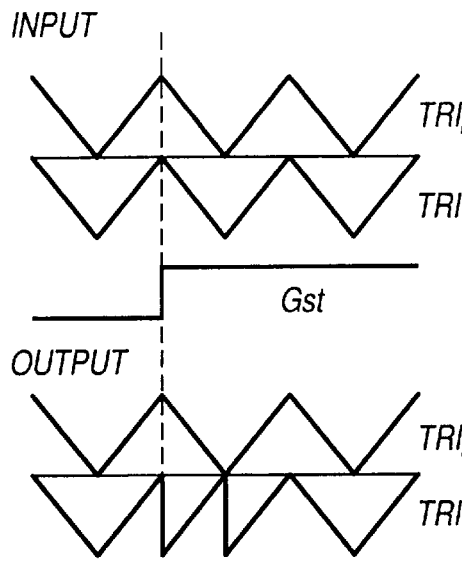
FIG. 13 is waveform diagrams for the triangular waves of the seventh actual configuration.
Figure 13B:
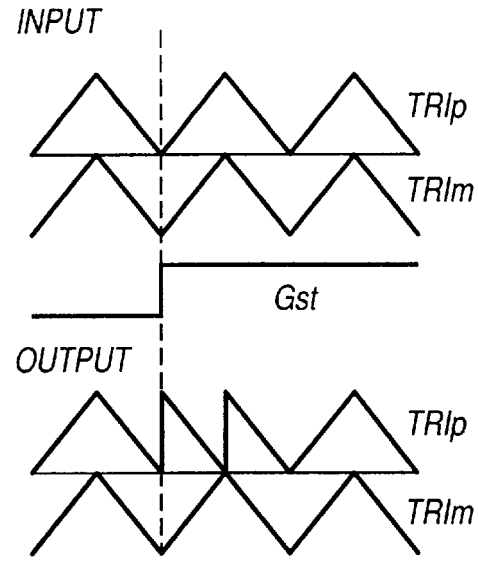

Triangular wave phase shift unit 55 takes as its inputs positive side triangular wave TRIp and negative side triangular wave TRIm outputted from the triangular wave generating unit 54 and gate start signal Gst. Depending on the triangular wave state at the time at which the gate start signal is inputted, when the gate start signal rises at the peak part of the positive side triangular wave, it outputs the phase of negative side triangular wave TRIm by shifting it 180 degrees during the half-cycle of the triangular wave as shown in FIG. 13(*a*), and outputs positive side triangular wave TRIp as it stands. Also, when gate start signal Gst rises in the trough part of the positive side triangular wave, it outputs the phase of positive side triangular wave TRIp by shifting it 180 degrees during the half-cycle of the triangular wave as shown in FIG. 13(*b*), and outputs negative side triangular wave TRIm as it stands.

PWM voltage operation unit 56 takes as its inputs 3-phase voltage instructions VuRef, VvRef and VwRef outputted from the voltage coordinates conversion unit 53 and positive side triangular wave TRIp and negative side triangular wave TRIm outputted from the triangular wave phase shift unit 55. It outputs 3-phase PWM voltage instructions.

Expressions 28

U phase:

When VuRef>TRIp: VuPWM=Vdc/2

When VuRef<TRIm: VuPWM=−Vdc/2

V phase:

When VvRef>TRIp: VvPWM=Vdc/2

When VvRef<TRIm: VvPWM=−Vdc/2

W phase:

When VwRef>TRIp: VwPWM=Vdc/2

When VwRef<TRIm: VwPWM=−Vdc/2

Then, the permanent magnet synchronous motor is controlled by controlling the output voltage of the NPC inverter using the above PWM voltage instructions.

Figure 14:
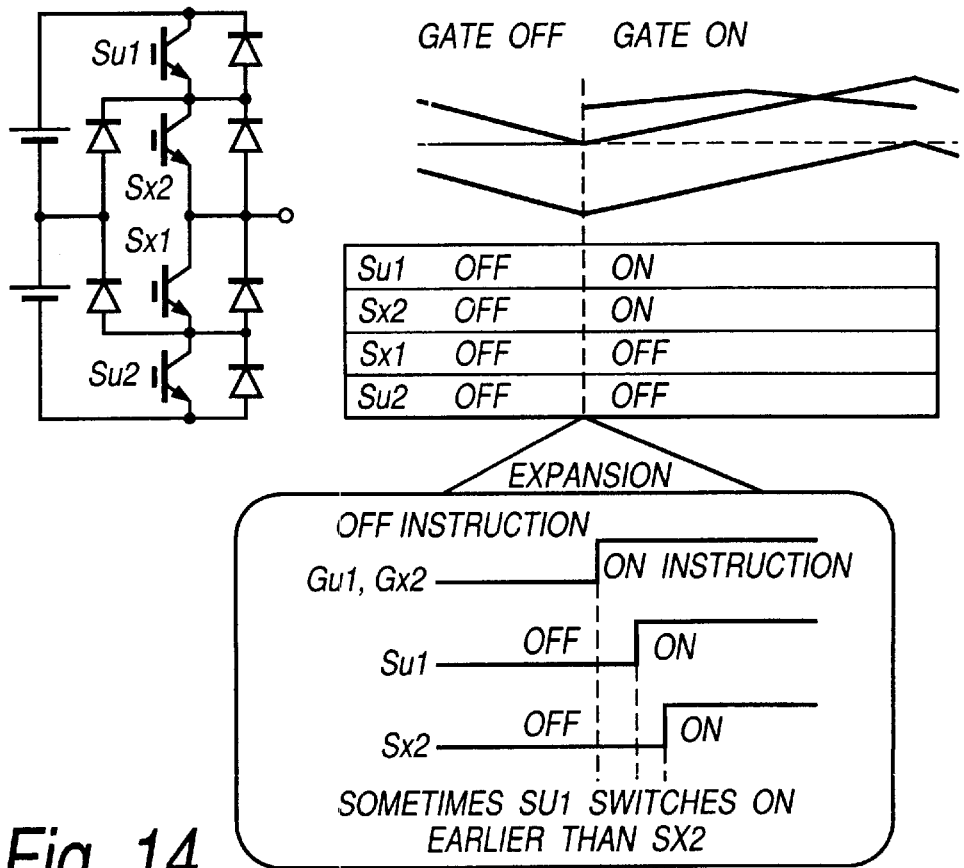
FIG. 14 is a switching illustration for the time when the triangular wave on one side is not shifted 180 degrees.

FIG. 14 is an illustration showing the switching when one side of the triangular waves is not shifted 180 degrees, and element SU1 comes ON earlier than SX2. FIG. 15 is an illustration showing the switching when. one side of the triangular waves is shifted 180 degrees.

With a control system for a permanent magnet synchronous motor composed in this way, the generation of rush currents during transition from coasting to power running is prevented by estimating the counter electromotive force. At the same time, the gate start signal is switched ON during the transition from coasting to power running. At the time at which the gate start signal is switched ON during the peak part of the positive side triangular wave, the negative side triangular wave is outputted by shifting it 180 degrees, which is a half-cycle. Also, at the time at which the gate start signal is switched ON during the trough part of the positive side triangular wave, the positive side is outputted by shifting it 180 degrees, which is a half-cycle. By this means, damage to the switching elements is prevented by the turn-ON timing.

Figure 16:
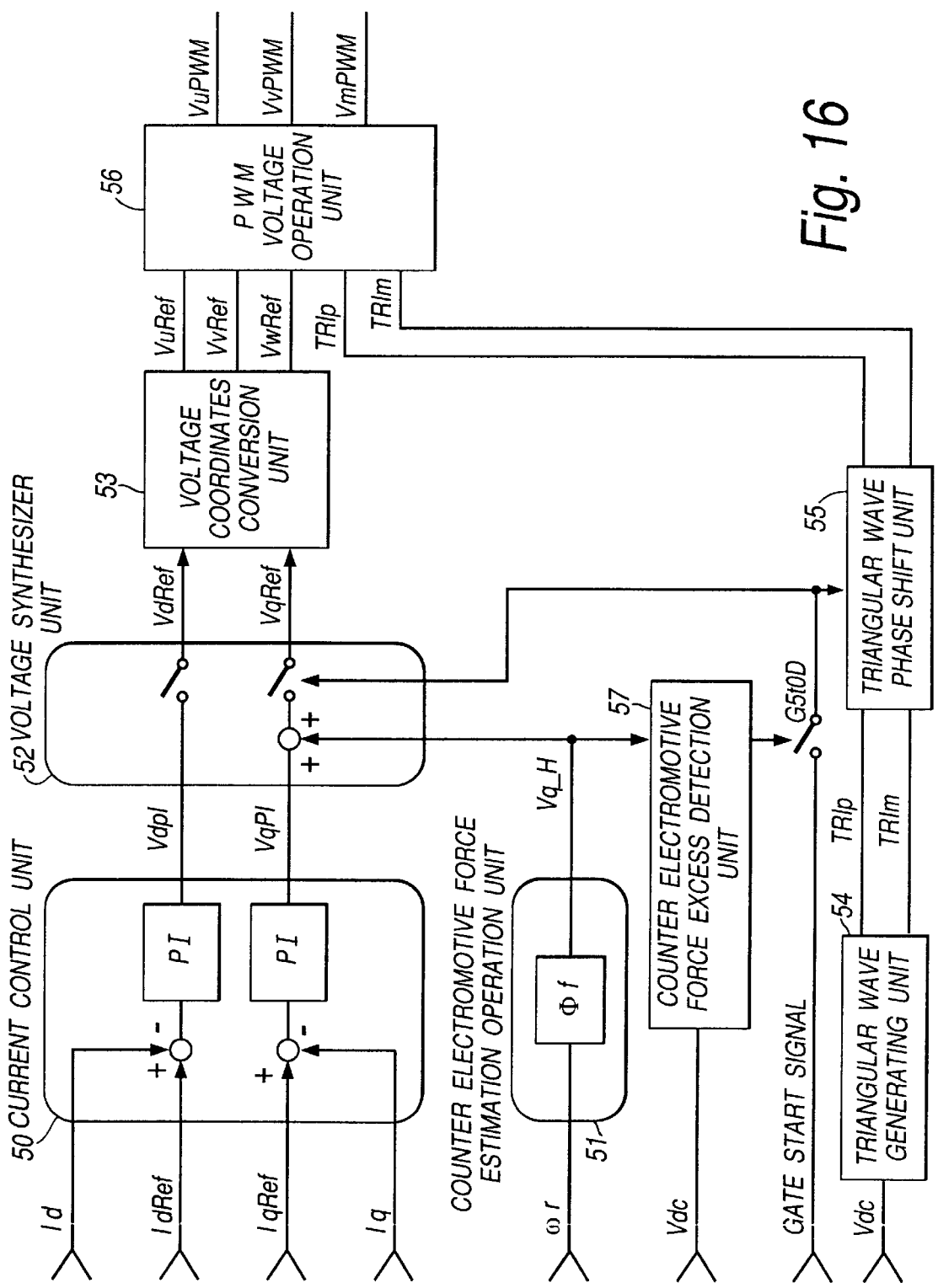
FIG. 16 is a functional block diagram of the eighth actual configuration of the control system.

The following is a description of an eighth actual configuration of this invention using FIG. 16.

The control system for a permanent magnet synchronous motor in the eighth actual configuration is composed of current control unit 50, counter electromotive force estimation operation unit 51, voltage synthesizer unit 52, voltage coordinates conversion unit 53, triangular wave generating unit 54, triangular wave phase shift unit 55, PWM voltage operation unit 56 and counter electromotive force excess detection unit 57.

In this construction, current control unit 50, counter electromotive force estimation operation unit 51, voltage synthesizer unit 52, voltage coordinates conversion unit 53, triangular wave generating unit 54, triangular wave phase shift unit 55 and PWM voltage operation unit 56 have the same operations as in the seventh actual configuration.

Counter electromotive force excess detection unit 57 takes as its inputs inverter DC link voltage Vdc and counter electromotive force estimated value Vq_H outputted from the counter electromotive force estimation operation unit 51. It outputs gate start suspension instruction Gstop when counter electromotive force estimated value Vq_H exceeds the inverter output permitted maximum voltage.

Expressions 29

When $Vq\_H > \frac{6}{\pi} * Vdc: Gstop = 1$

When $Vq\_H \leq \frac{6}{\pi} * Vdc: Gstop = 0$

With a control system for a permanent magnet synchronous motor composed in this way, the generation of rush currents during transition from coasting to power running is prevented by estimating the counter electromotive force. At the same time, the gate start signal is switched ON during the transition from coasting to power running. At the time at which the gate start signal is switched ON during the peak part of the positive side triangular wave, the negative side triangular wave is outputted by shifting it 180 degrees, which is a half-cycle. Also, at the time at which the gate start signal is switched ON during the trough part of the positive side triangular wave, the positive side is outputted by shifting it 180 degrees, which is a half-cycle. By this means, damage to the switching elements is prevented by the turn-ON timing. In addition, the execution of transition to power running is not possible when the counter electromotive force exceeds the inverter output permitted maximum voltage.

Figure 17:
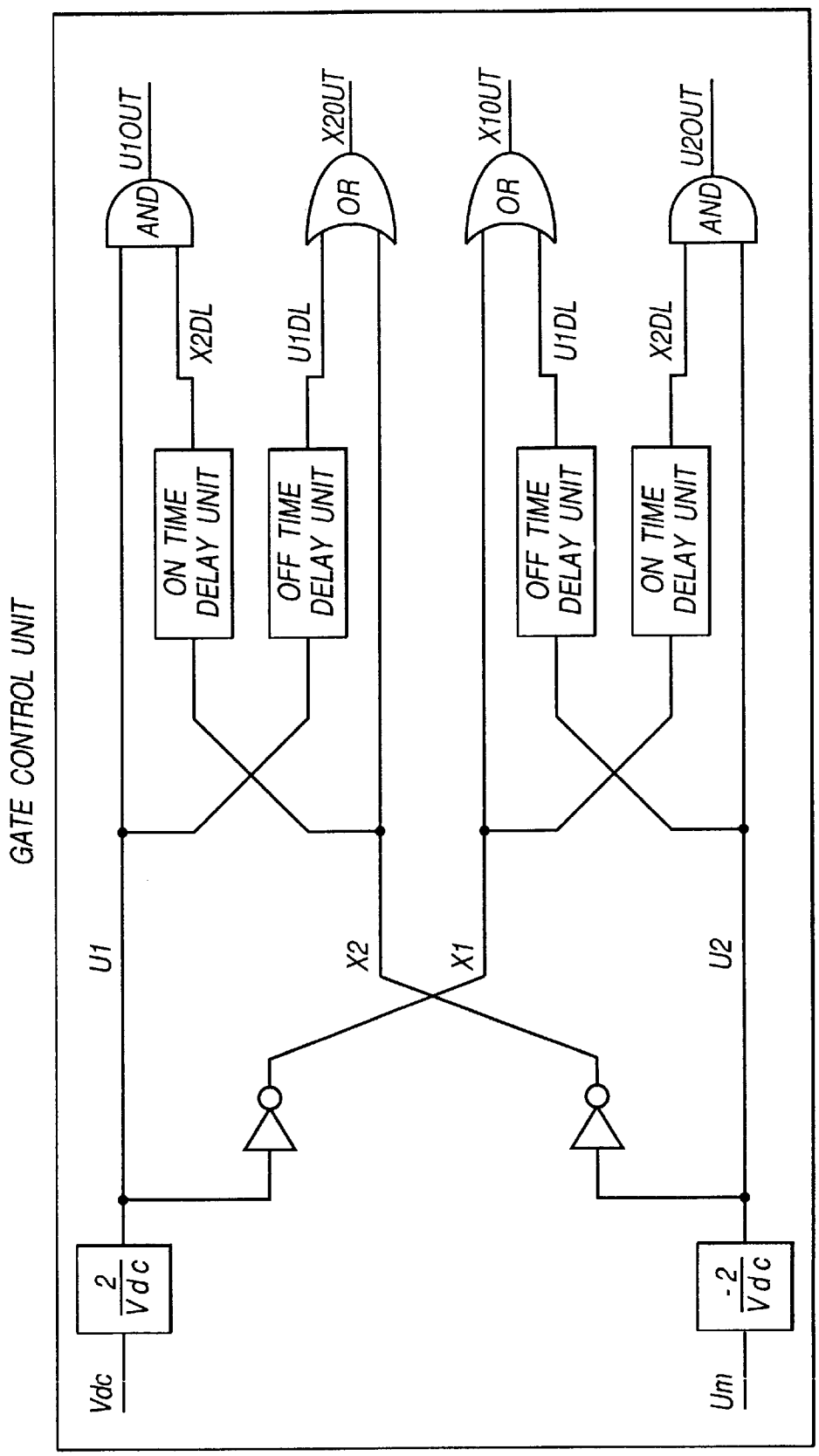
FIG. 17 is a functional block diagram of the gate control unit of the ninth actual configuration.
Figure 19:
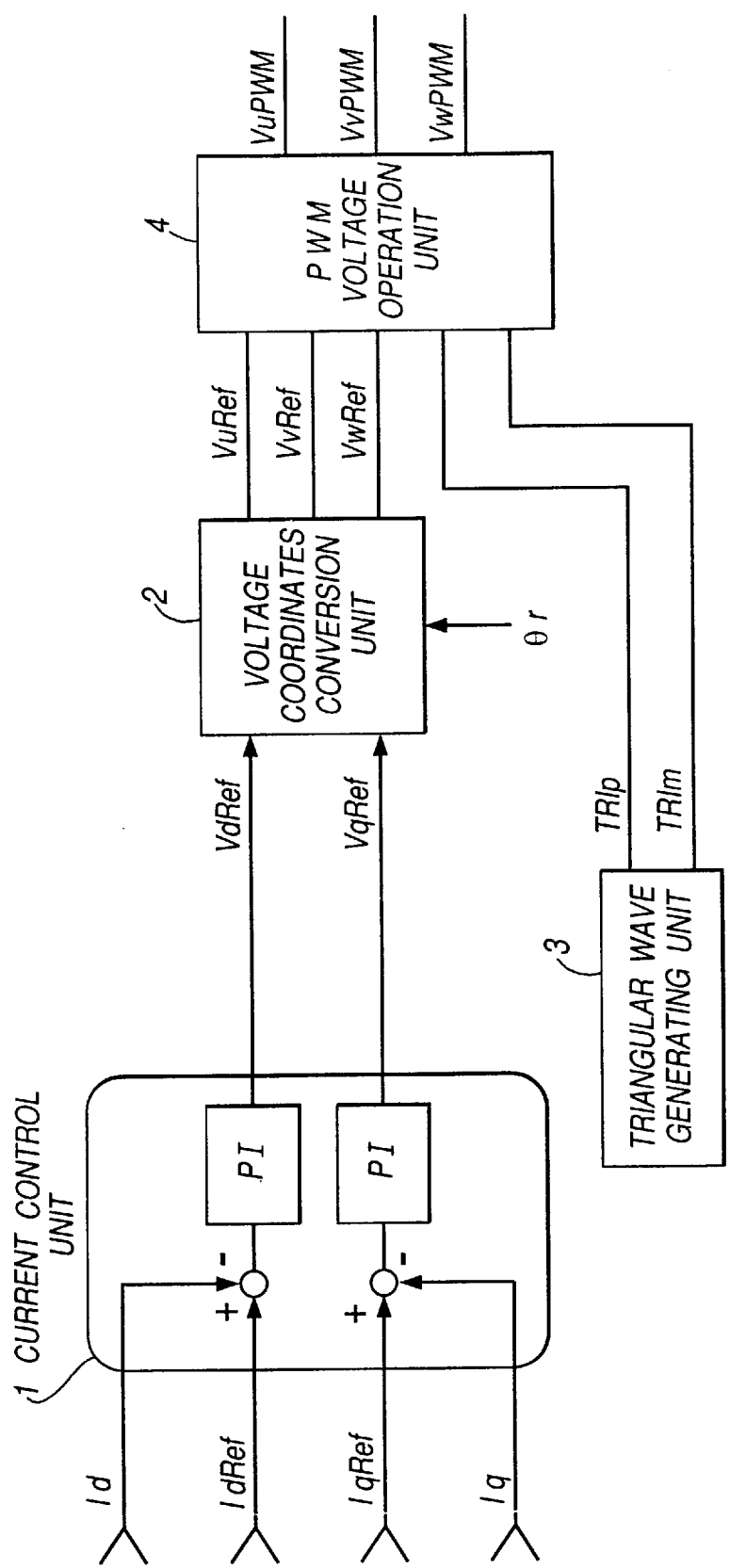
FIG. 19 is a functional block diagram of a prior art control system.

The following is a description of a ninth actual configuration of this invention using FIGS. 17 and 18.

The ninth actual configuration concerns gate control units. The U-phase gate control unit is described as an example.

U-phase positive side PWM voltage instruction Up and U-phase negative side PWM voltage instruction Um are found from U-phase PWM voltage instruction VuPWM by the following equations.

Expressions 30

When VuPWM≧0: Up=VuPWM, Um=0

When VuPWM<0 Up=0, Um=VuPPM

U-phase switching element ON/OFF instructions U1, X1, X2 and U2 are given by U-phase positive side PWM voltage instruction Up and U-phase negative side PWM voltage instruction Um in the following way.

Expressions 31

When Up=Vdc/2: U1=1, X1=0

When Up=0: U1=0, X1=1

When Um=−Vdc/2: U2=1, X2=0

When Um=0: U2=0, X2=1

ON/OFF signal U1out for switching element U1 is obtained by logical multiplication of ON/OFF instruction U1 and signal X2DL obtained by passing ON/OFF instruction X2 through an ON-time delay unit.

With an ON-time delay unit, as shown in FIG. 18, when the inputted signal changes from 0 to 1, a rising signal is outputted by delaying it for a constant time Tdon.

Also, ON/OFF signal X2out for switching element X2 is obtained by logical multiplication of ON/OFF instruction X2 and signal U1DL obtained by passing ON/OFF instruction U1 through an OFF-time delay unit.

With an OFF-time delay unit, as shown in FIG. 18, when the inputted signal changes from 1 to 0, a falling signal is outputted by delaying it for a constant time Tdoff.

In the same way, ON/OFF signal X1out for switching element X1 is obtained by the logical multiplication of ON/OFF instruction X1 and signal U2DL obtained by passing ON/OFF instruction U2 through an OFF-time delay unit.

Similarly, ON/OFF signal U2out for switching element U2 is obtained by the logical multiplication of ON/OFF instruction U2 and signal X1DL obtained by passing ON/OFF instruction X1 through an ON-time delay unit.

By controlling the NPC inverter using ON/OFF signals U1out, X1out, X2out and U2out obtained in this way, damage to the switching elements by the randomness of gate ON delay times between switching elements directly connected to the NPC inverter can be prevented.

With the control system for a permanent magnet synchronous motor of this invention, if the motor revolution frequency exceeds a specified value the voltage vector size is made a specified voltage vector size and the modulation factor is found based on that value. At the same time, a magnetic flux direction current correction value is found based on the voltage vector size from the polar coordinates conversion unit and the above specified voltage vector size. The stability of the current control system can be ensured by correcting the magnetic flux direction current instruction with this value, even if the motor terminal voltage exceeds the maximum output voltage of the power conversion system.

Also, when using the control system for a permanent magnet synchronous motor of this invention, in addition to the above, transition between variable voltage control and fixed voltage control can be smoothly exercised by gradually varying the weighting during transition between variable voltage control and fixed voltage control.

Also, with the control system for a permanent magnet synchronous motor of this invention, in the current instruction value operation unit, the magnetic flux direction current instruction and the torque direction current instruction are operated by two operation methods for the case of the motor revolution frequency exceeding the specified value and the case of not exceeding it. Also, in the case of the motor revolution frequency exceeding the specified value, the stability of the current control system can be ensured by correcting the magnetic flux direction current instruction, even if the motor terminal voltage exceeds the maximum output voltage of the power conversion system.

Moreover, with the control system for a permanent magnet synchronous motor of this invention, the fact that the DC link voltage has become greater than the state of the DC power source is judged by the sign of the magnetic flux direction current instruction. Wasteful current flow in the magnetic flux direction can be prevented by reducing the voltage vector size instruction vale so that the magnetic flux direction current becomes almost zero.

With the above control system for a permanent magnet synchronous motor, when the permanent magnet magnetic flux varies, the permanent magnet magnetic flux is estimated by using the fact that the counter electromotive force varies in proportion to that. Thus the output torque can be made to follow the torque instruction by correcting the torque direction current instruction, even if the permanent magnet magnetic flux varies due to the temperature.

Furthermore, with the control system for a permanent magnet synchronous motor of this invention, rush current generation is prevented during transition from coasting to power running by estimating the counter electromotive force. At the same time, the gate start signal is switched ON during the transition from coasting to power running. At the time at which the gate start signal is switched ON during the peak part of the positive side triangular wave, the negative side triangular wave is outputted by shifting it 180 degrees, which is a half-cycle. Also, at the time at which the gate start signal is switched ON during the trough part of the positive side triangular wave, the positive side is outputted by shifting it 180 degrees, which is a half-cycle. By this means, damage to the switching elements is prevented by the turn-ON timing.

What is claimed is:

1. A control system which controls a permanent magnet synchronous motor via a power conversion system, comprising:

a current instruction value operation unit having inputs including a torque instruction, an angular frequency of the motor and a magnetic flux direction current correction value, and having outputs including a magnetic flux direction current instruction and a torque direction current instruction;

a voltage instruction operation unit having inputs including the magnetic flux direction current instruction and the torque direction current instruction outputted by said current instruction value operation unit, and having outputs including a magnetic flux direction voltage instruction and a torque direction voltage instruction;

a polar coordinates conversion unit having inputs including the magnetic flux direction voltage instruction and the torque direction voltage instruction outputted by said voltage instruction operation unit, and having outputs including a voltage vector size and a voltage vector angle to a magnetic flux axis direction;

a voltage fixing unit having inputs including the voltage vector size outputted by said polar coordinates conversion unit, a voltage vector size instruction value and a voltage fixing instruction, and having an output including a fresh voltage vector size of one of the voltage vector size outputted by said polar coordinates conversion unit and the voltage vector size instruction value, said fresh voltage vector size is selected based on the voltage fixing instruction;

a magnetic flux direction current correction value operation unit having inputs including the voltage vector size outputted by said polar coordinates conversion unit and the fresh voltage vector size outputted by said voltage fixing unit, and having an output including said magnetic flux direction current correction value;

a modulation factor operation unit having inputs including the fresh voltage vector size outputted by said voltage fixing unit and a DC link voltage of said power conversion system, and having an output including a modulation factor of said power conversion system;

a torque current control unit having inputs including the torque direction current instruction outputted by said current instruction value operation unit and a torque current actual value, and having an output including a torque angle correction value; and a PWM voltage generating unit having inputs including the modulation factor outputted by said modulation factor operation unit and a sum of the voltage vector angle outputted by said polar coordinates conversion unit, the torque angle correction value outputted by said torque current control unit and a permanent magnet magnetic flux angle, and having outputs including PWM voltage instructions for said power conversion system.

2. A control system which controls a permanent magnet synchronous motor via a power conversion system, comprising:

a current instruction value operation unit having inputs including a torque instruction, an angular frequency of the motor and a magnetic flux direction current correction value, and having outputs including a magnetic flux direction current instruction and a torque direction current instruction;

a voltage instruction operation unit having inputs including the magnetic flux direction current instruction and the torque direction current instruction outputted by said current instruction value operation unit, and having outputs including a magnetic flux direction voltage instruction and a torque direction voltage instruction;

a weighting factor operation unit having an input including the angular frequency of the motor, and having outputs including a first weighting factor and a second weighting factor;

a d axis current control unit having an input equal to a value of the first weighting factor outputted by said weighting factor operation unit multiplied by a difference between the magnetic flux direction current instruction outputted by said current instruction value operation unit and a magnetic flux current actual value, and having an output including a magnetic flux direction voltage correction value;

a q axis current control unit having an input equal to a value of the first weighting factor outputted by said weighting factor operation unit multiplied by a difference between the torque direction current instruction outputted by said current instruction value operation unit and a torque current actual value, and having an output including a torque direction voltage correction value;

a polar coordinates conversion unit having inputs including a sum of the magnetic flux direction voltage instruction outputted by said voltage instruction operation unit and the magnetic flux direction voltage correction value outputted by said d axis current control unit, and a sum of the torque direction voltage instruction outputted by said voltage instruction operation unit and the torque direction voltage correction value outputted by said q axis current control unit, and having outputs including a voltage vector size and a voltage vector angle to magnetic flux axis direction;

a voltage fixing unit having inputs including the voltage vector size outputted by said polar coordinates conversion unit, a voltage vector size instruction value and a voltage fixing instruction, and having an output including a voltage vector size of one of the voltage vector size outputted by said polar coordinates conversion unit and the voltage vector size instruction value, said fresh voltage vector size is selected based on the voltage fixing instruction;

a magnetic flux direction current correction value operation unit having inputs including the voltage vector size outputted by said polar coordinates conversion unit and the fresh voltage vector size outputted by said voltage fixing unit, and having an output including said magnetic flux direction current correction value;

a modulation factor operation unit having inputs including the fresh voltage vector size outputted by said voltage fixing unit and a DC link voltage of said power conversion system, and having an output including a modulation factor of said power conversion system;

a torque current control unit having an input equal to a value of the second weighting factor outputted by said weighting factor operation unit multiplied by the difference between the torque direction current instruction outputted by said current instruction value operation unit and the torque current actual value, and having an output including a torque angle correction value; and a PWM voltage generating unit having inputs including the modulation factor outputted by said modulation factor operation unit and a sum of the voltage vector angle outputted by said polar coordinates conversion unit the torque angle correction value outputted by said torque current control unit and a permanent magnet magnetic flux angle, and having outputs including PWM voltage instructions for said power conversion system.

3. A control system which controls a permanent magnet synchronous motor via a power conversion system, comprising:

a current instruction value operation unit having inputs including a voltage vector size instruction, a torque instruction, an angular frequency of the motor and a voltage fixing instruction, and having outputs including a magnetic flux direction current instruction and a torque direction current instruction;

a voltage instruction operation unit having inputs including the magnetic flux direction current instruction and the torque direction current instruction outputted by said current instruction value operation unit, and having outputs including a magnetic flux direction voltage instruction and a torque direction voltage instruction;

a polar coordinates conversion unit having inputs including the magnetic flux direction voltage instruction and the torque direction voltage instruction outputted by said voltage instruction operation unit, and having outputs including a voltage vector size and a voltage vector angle to a magnetic flux axis direction;

a modulation factor operation unit having inputs including the voltage vector size outputted by said polar coordinates conversion unit and a DC link voltage of said power conversion system, and having an output including a modulation factor of said power conversion system;

a torque current control unit having inputs including the torque direction current instruction outputted by said current instruction value operation unit and a torque current actual value, and having an output including a torque angle correction value; and a PWM voltage generating unit having inputs including the modulation factor outputted by said modulation factor operation unit and a sum of the voltage vector angle outputted by said polar coordinates conversion units, the torque angle correction value outputted by said torque current control unit and a permanent magnet magnetic flux angle, and having outputs including PWM voltage instructions for said power conversion system.

4. A control system which controls a permanent magnet synchronous motor via a power conversion system, comprising:

a current instruction value operation unit having inputs including a torque instruction, an angular frequency of the motor and a magnetic flux direction current correction value, and having outs including a magnetic flux direction current instruction and a torque direction current instruction;

a voltage instruction operation unit having inputs including the magnetic flux direction current instruction and the torque direction current instruction outputted by said current instruction value operation unit, and having outputs including a magnetic flux direction voltage instruction and a torque direction voltage instruction;

a polar coordinates conversion unit having inputs including the magnetic flux direction voltage instruction and the torque direction voltage instruction outputted by said voltage instruction operation unit, and having outputs including a voltage vector size and a voltage vector angle to a magnetic flux axis direction;

a voltage vector size instruction value operation unit having inputs including the angular frequency of the motor, the magnetic flux direction current instruction outputted by said current instruction value operation unit and a DC link voltage of said power conversion system, and having an out including a voltage vector size instruction;

a voltage fixing unit having inputs including the voltage vector size outputted by said polar coordinates conversion unit, the voltage vector size instruction outputted by said voltage vector size instruction value operation unit and a voltage fixing instruction, and having an output including a fresh voltage vector size of one of the voltage vector size ouputted by said polar coordinates conversion unit and the voltage vector size instruction outputted by said voltage vector size instruction value operation unit, said fresh voltage vector size is selected based on the voltage fixing instruction;

a magnetic flux direction current correction value operation unit having inputs including the voltage vector size outputted by said polar coordinates conversion unit and the fresh voltage vector size outputted by said voltage fixing unit, and having an output including said magnetic flux direction current correction value;

a modulation factor operation unit having inputs including the fresh voltage vector size outputted by said voltage fixing unit and the DC link voltage of said power conversion system, and having an output including a modulation factor of said power conversion system;

a torque current control unit having inputs including the torque direction current instruction outputted by said current instruction value operation unit and a torque current actual value, and having an output including a torque angle correction value; and a PWM volt age generating unit having inputs including the modulation factor outputted by said modulation factor operation unit and a sum of the voltage vector angle outputted by said polar coordinates conversion unit, the torque angle correction value outputted by said torque current control unit and a permanent magnet magnetic flux angle, and having outputs including PWM voltage instructions for said power conversion system.

5. A control system which controls a permanent magnet synchronous motor via a power conversion system, comprising:

a permanent magnet magnetic flux estimation unit having inputs including an angular frequency of the motor, a magnetic flux direction current instruction and a torque direction voltage instruction, and having an output including a permanent magnet magnetic flux estimated value;

a current instruction value operation unit having inputs including a torque instruction, said angular frequency of the motor and a magnetic flux direction current correction value and the permanent magnet magnetic flux estimated value outputted by said permanent magnet magnetic flux estimation unit, and having outputs including the magnetic flux direction current instruction and a torque direction current instruction;

a voltage instruction operation unit having inputs including the magnetic flux direction current instruction and the torque direction current instruction outputted by said current instruction value operation unit, and having outputs including a magnetic flux direction voltage instruction and the torque direction voltage instruction;

a polar coordinates conversion unit having inputs including the magnetic flux direction voltage instruction and the torque direction voltage instruction outputted by said voltage instruction operation unit, and having outputs including a voltage vector size and a voltage vector angle to a magnetic flux axis direction;

a voltage fixing unit having inputs including the voltage vector size outputted by said polar coordinates conversion unit, a voltage vector size instruction value and a voltage fixing instruction, and having an output including a fresh voltage vector size of one of the voltage vector size outputted by said polar coordinates conversion unit and the voltage vector size instruction value, said fresh voltage size is selected based on the voltage fixing instruction;

a magnetic flux direction current correction value operation unit having inputs including the voltage vector size outputted by said polar coordinates conversion unit and the fresh voltage vector size outputted by said voltage fixing unit, and having an output including a said magnetic flux direction current correction value;

a modulation factor operation unit having inputs including the fresh voltage vector size outputted by said voltage fixing unit and a DC link voltage of said power conversion system, and having an output including a modulation factor of said power conversion system;

a torque current control unit having inputs including the torque direction current instruction outputted by said current instruction value operation unit and a torque current actual value, and having an output including a torque angle correction value; and a PWM voltage generating unit having inputs including the modulation factor outputted by said modulation factor operation unit and a sum of the voltage vector angle outputted by said polar coordinates conversion unit and a sum of the torque angle correction value outputted by said torque current control unit and a permanent magnet magnetic flux angle, and having outputs including PWM voltage instructions for said power conversion system.

6. The control system according to claim 5, wherein the permanent magnet magnetic flux estimation unit comprises inputs including the DC link voltage of the power conversion system, a DC input current of the power conversion system, the angular frequency of the motor and the torque instruction, and having an output including the permanent magnet magnetic flux estimated value.

7. A control system which controls a permanent magnet synchronous motor via a neutral point clamp type power conversion system, comprising:

a current control unit having inputs including a magnetic flux direction current instruction, a magnetic flux direction current actual value, a torque direction current instruction and a torque direction current actual value, and having outputs including a magnetic flux direction PI control voltage instruction and a torque direction PI control voltage instruction by proportional-plus-integral control;

a counter electromotive force estimation operation unit having an input including an angular frequency of the motor, and having an output including a counter electromotive force estimated value;

a voltage synthesizer unit having inputs including the magnetic flux direction PI control voltage instruction and the torque direction PI control voltage instruction outputted by said current control unit, the counter electromotive force estimated value outputted by said counter electromotive force estimation operation unit and a gate start signal which indicates whether the permanent magnet synchronous motor is power running or coasting, and having outputs including a magnetic flux direction voltage instruction and a torque direction voltage instruction;

a voltage coordinates conversion unit having inputs including the magnetic flux direction voltage instruction and the torque direction voltage instruction outputted by said voltage synthesizer unit and a motor magnetic flux angle, and having outputs including 3-phase voltage instructions;

a triangular wave generating unit having outputs including a positive triangular wave and a negative triangular wave;

a triangular wave phase shift unit having inputs including the gate start signal and the positive triangular wave and the negative triangular wave outputted by said triangular wave generating unit, and having outputs including one of a phase of the positive triangular wave and a phase of the negative triangular wave, by shifting said one of the phase of the positive triangular wave and the phase of the negative triangular wave by a half cycle, that is 180 degrees, based on a timing of a rising of the gate start signal; and a PWM voltage operation unit having inputs including the 3-phase voltage instructions outputted by said voltage coordinates conversion unit and the one of the phase of the positive triangular wave and the phase of the negative triangular wave outputted by said triangular wave phase shift unit, and having outputs including 3-phase PWM voltage instructions by PWM control.

8. The control system according to claim 7, further comprising:

a counter electromotive force excess detection unit having inputs including a DC link voltage of the power conversion system and the counter electromotive force estimated value outputted by the counter electromotive force estimation operation unit, and which suspends the output of the gate start signal when the counter electromotive force estimated value exceeds the DC link voltage.

* * * * *